(12) United States Patent
Murozuka

(10) Patent No.: US 11,924,568 B2
(45) Date of Patent: Mar. 5, 2024

(54) SIGNAL PROCESSING DEVICE, SIGNAL PROCESSING METHOD, AND IMAGING APPARATUS

(71) Applicant: Sony Semiconductor Solutions Corporation, Kanagawa (JP)

(72) Inventor: Masaki Murozuka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 247 days.

(21) Appl. No.: 17/623,712

(22) PCT Filed: Jul. 20, 2020

(86) PCT No.: PCT/JP2020/028156
§ 371 (c)(1),
(2) Date: Dec. 29, 2021

(87) PCT Pub. No.: WO2021/024784
PCT Pub. Date: Feb. 11, 2021

(65) Prior Publication Data
US 2022/0264041 A1 Aug. 18, 2022

(30) Foreign Application Priority Data
Aug. 8, 2019 (JP) .................................. 2019-146248

(51) Int. Cl.
*H04N 25/75* (2023.01)
*H04N 5/06* (2006.01)
(Continued)

(52) U.S. Cl.
CPC .............. *H04N 25/75* (2023.01); *H04N 5/06* (2013.01); *H04N 17/004* (2013.01); *H04N 9/3191* (2013.01); *H04N 23/12* (2023.01)

(58) Field of Classification Search
CPC ........ H04N 25/75; H04N 5/06; H04N 17/004; H04N 9/3191; H04N 23/12; H04N 23/60; H04N 25/68; G06F 11/22
See application file for complete search history.

(56) References Cited

U.S. PATENT DOCUMENTS

2015/0339130 A1* 11/2015 Kruglick ........ G01R 31/318519
713/100
2019/0012763 A1* 1/2019 Kobayashi ................ G06T 1/20
(Continued)

FOREIGN PATENT DOCUMENTS

| JP | H06-233332 A | 8/1994 |
|---|---|---|
| JP | H09-101903 A | 4/1997 |

(Continued)

OTHER PUBLICATIONS

International Search Report (PCT/ISA/210), International Application No. PCT/JP2020/028156, dated Sep. 4, 2020.

*Primary Examiner* — Padma Haliyur
(74) *Attorney, Agent, or Firm* — Michael Best & Friedrich LLP

(57) ABSTRACT

In one example, a signal processing device includes first processors, a controller, a first selection section, a second processor, a second selection section, and a first comparison section. The first processors are associated with first signals. The first processors perform a predetermined process on the basis of an associated first signal to generate a second signal. The controller generates a selection control signal. The first selection section selects the first signal to be supplied to a selected first processor on the basis of the selection control signal. The second processor performs the predetermined process on the basis of the selected first signal to generate a third signal. The second selection section selects the second signal generated by the selected first processor. The first (Continued)

comparison section compares the third signal and the second signal selected by the second selection section of the second signals with each other.

13 Claims, 19 Drawing Sheets

(51) Int. Cl.
*H04N 9/31* (2006.01)
*H04N 17/00* (2006.01)
*H04N 23/12* (2023.01)

(56) References Cited

U.S. PATENT DOCUMENTS

2020/0137286 A1* 4/2020 Takado .................... G01S 17/08
2020/0412950 A1* 12/2020 Kawazu ............... H04N 25/709

FOREIGN PATENT DOCUMENTS

| JP | 2005-274384 A | 10/2005 |
| JP | 2019-004361 A | 1/2019 |

\* cited by examiner

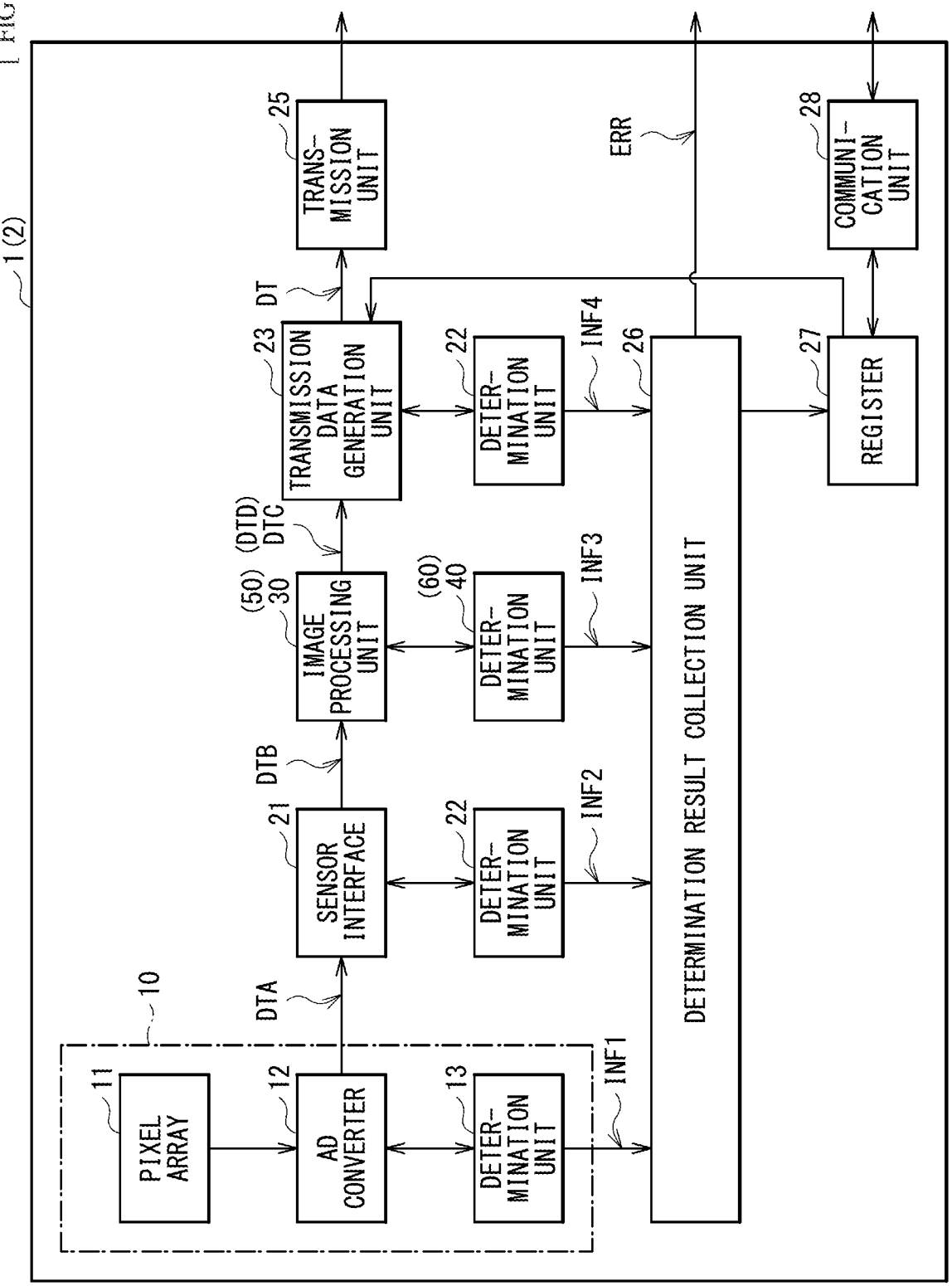
[FIG. 1]

[FIG. 2]
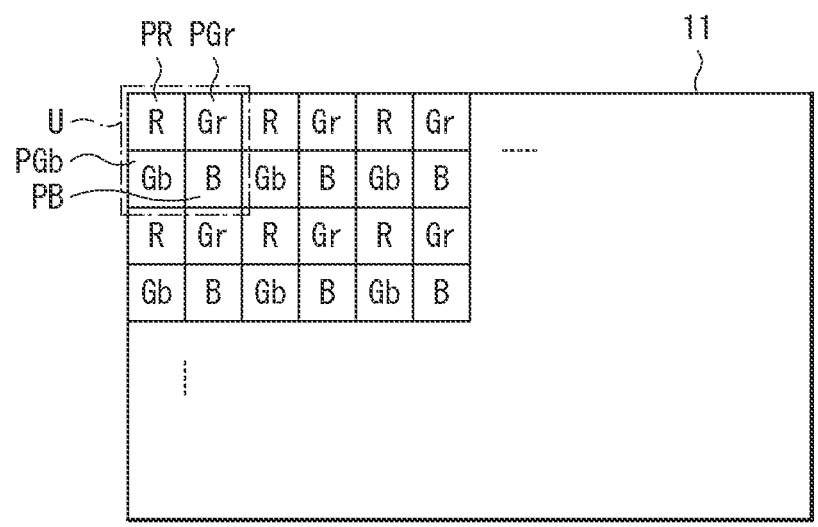

[ FIG. 3 ]
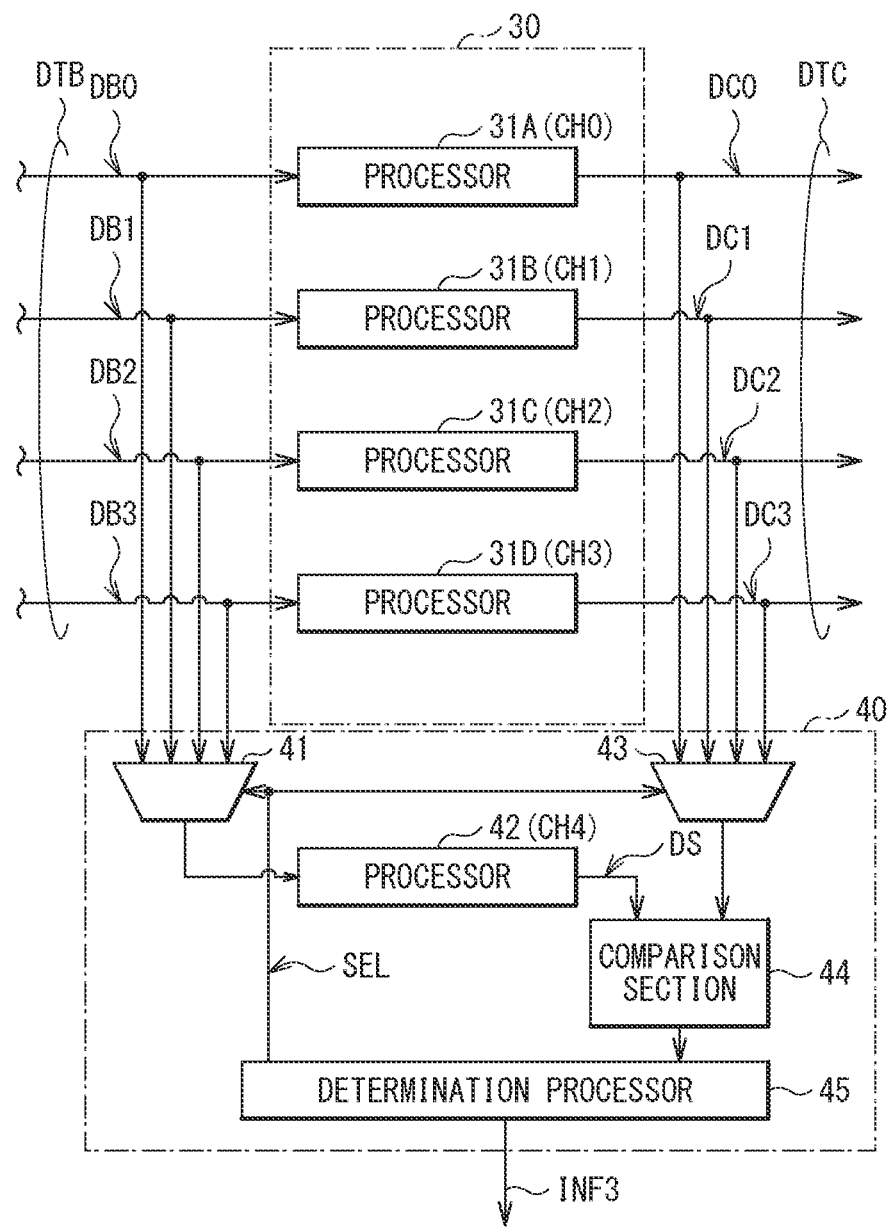

[FIG. 4]
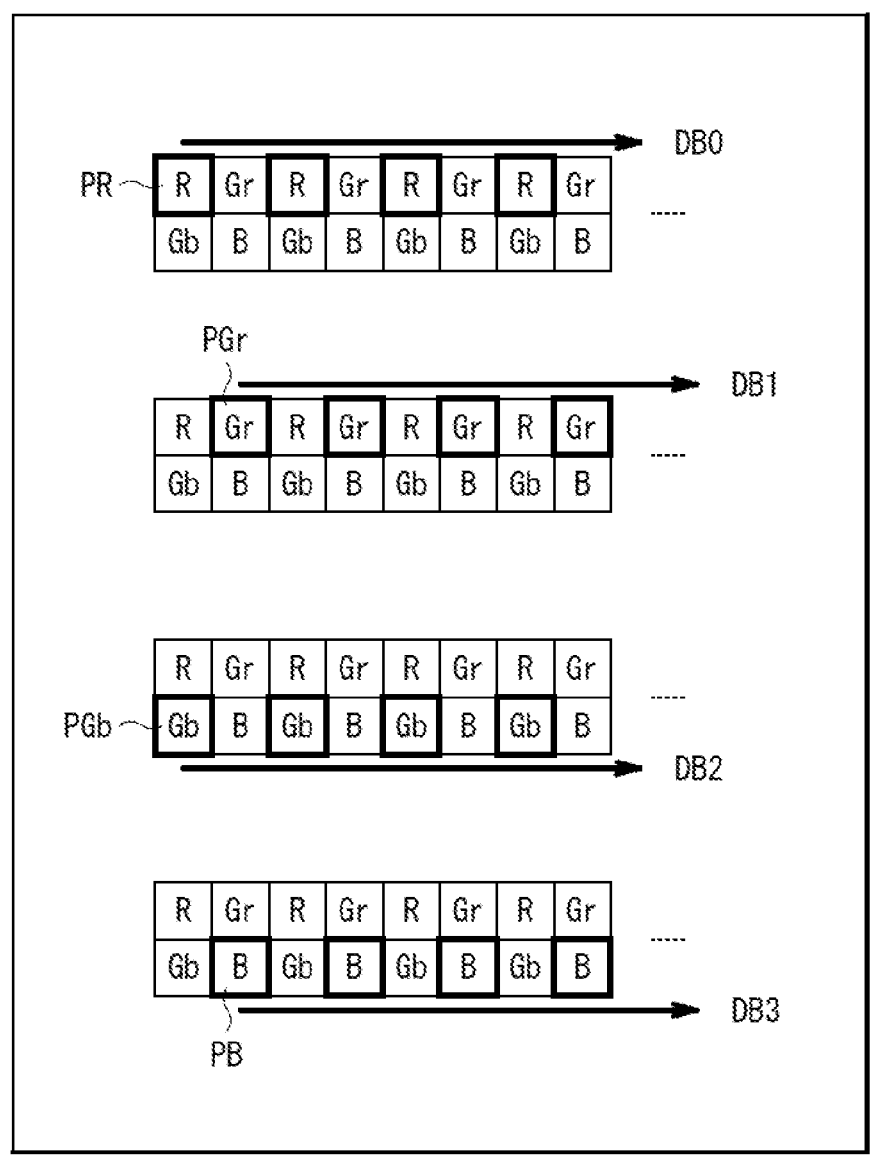

[FIG. 5]
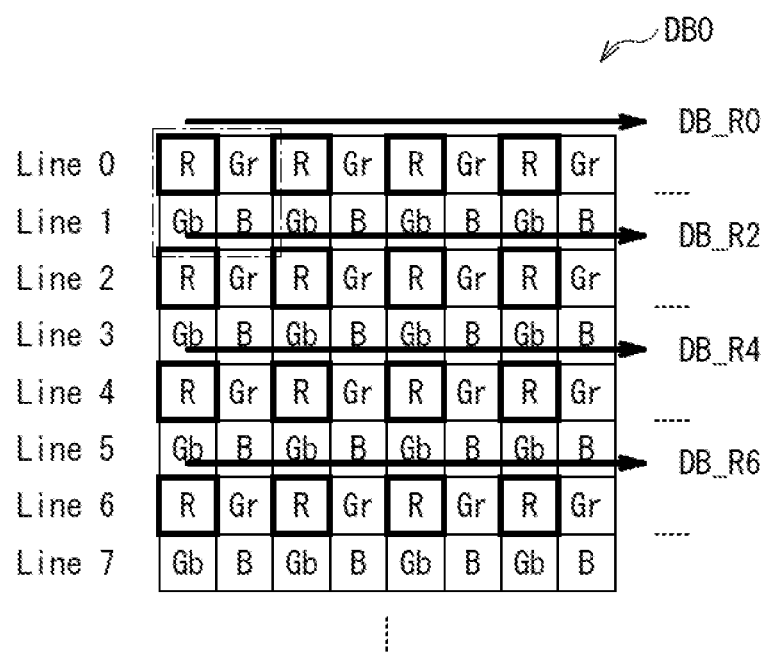
[FIG. 6]
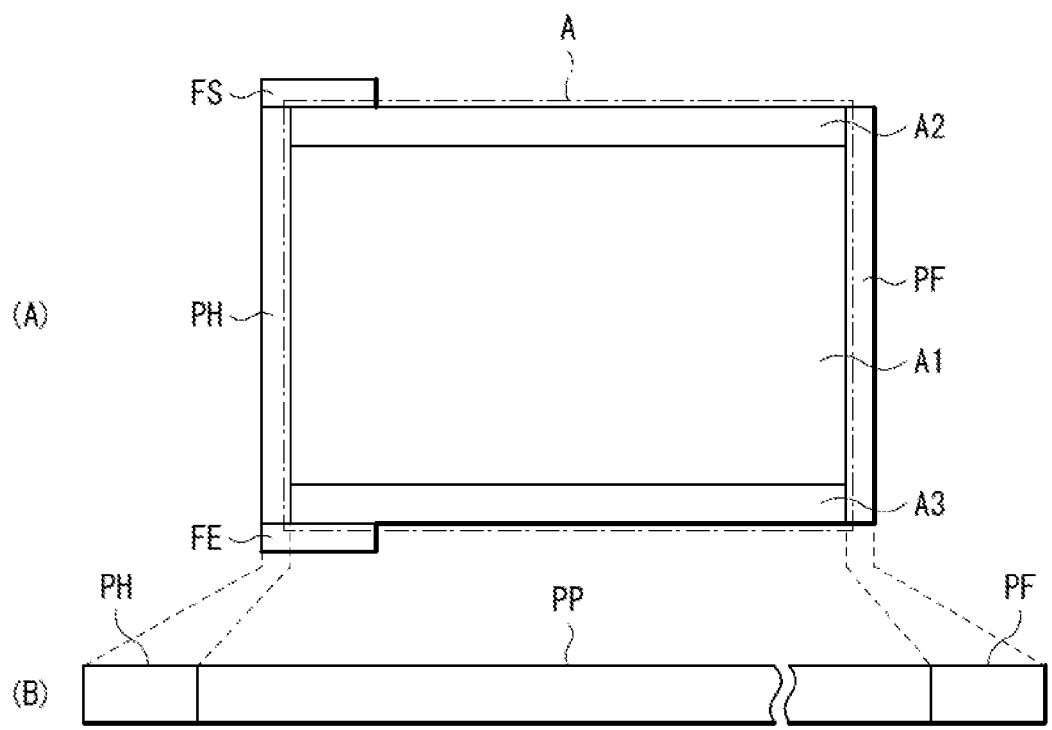

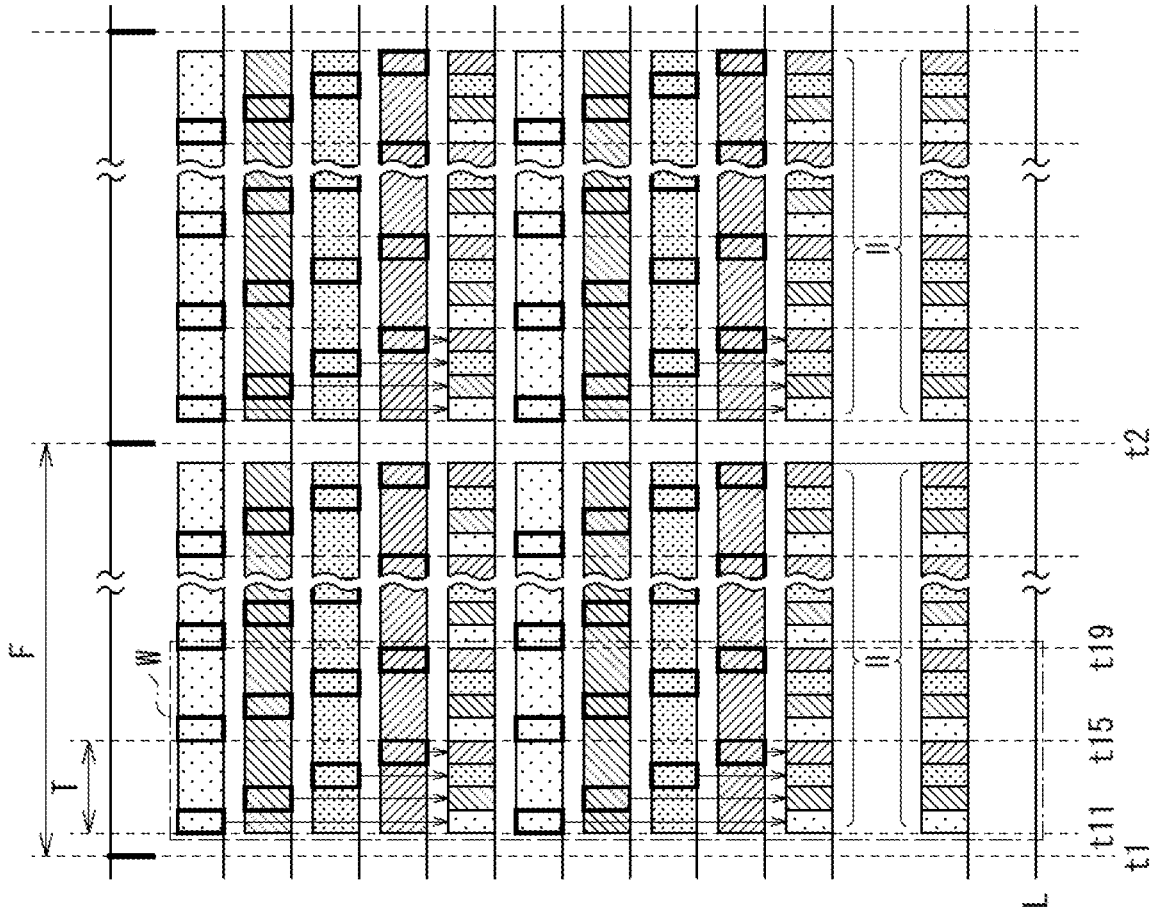

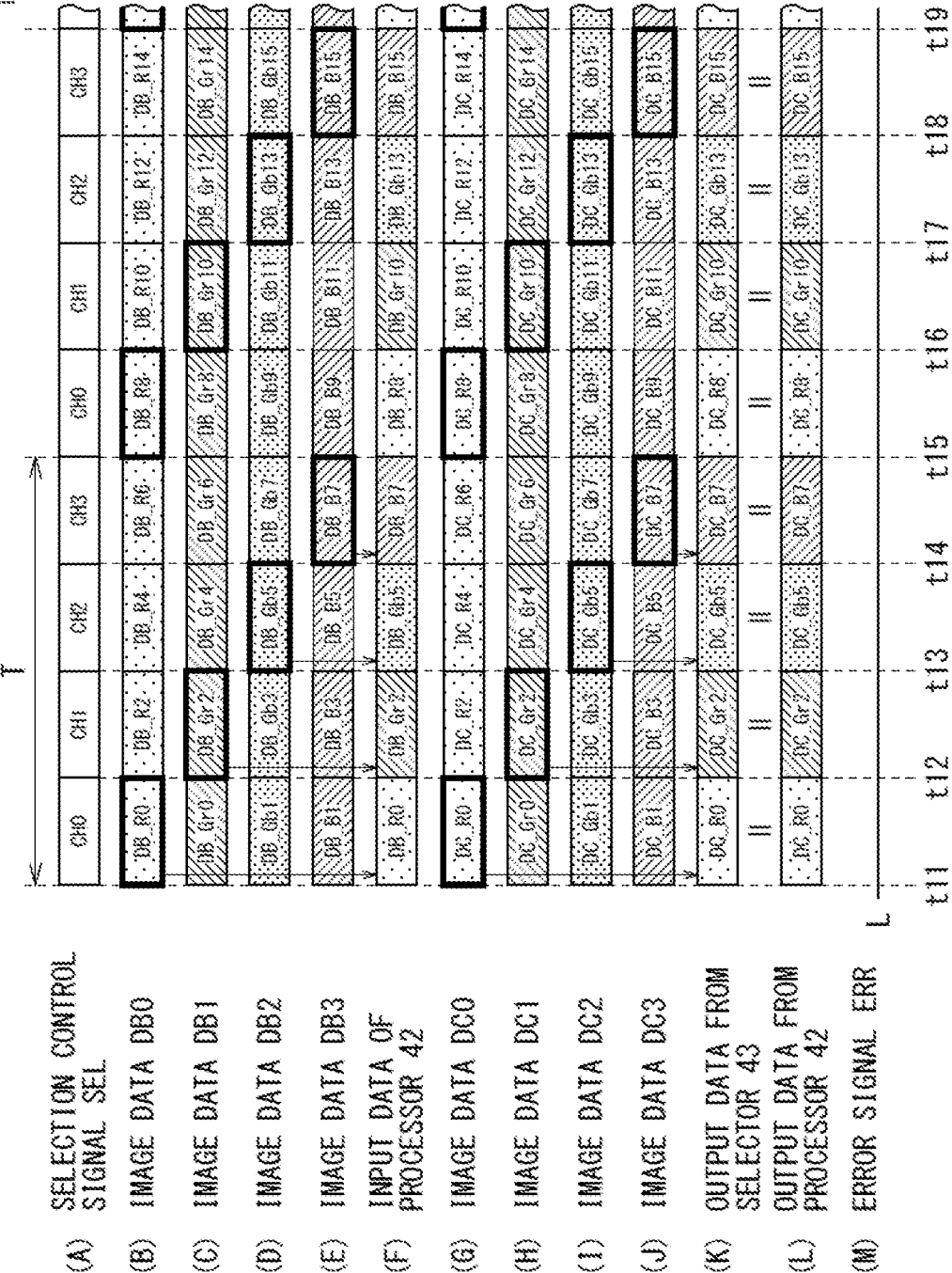

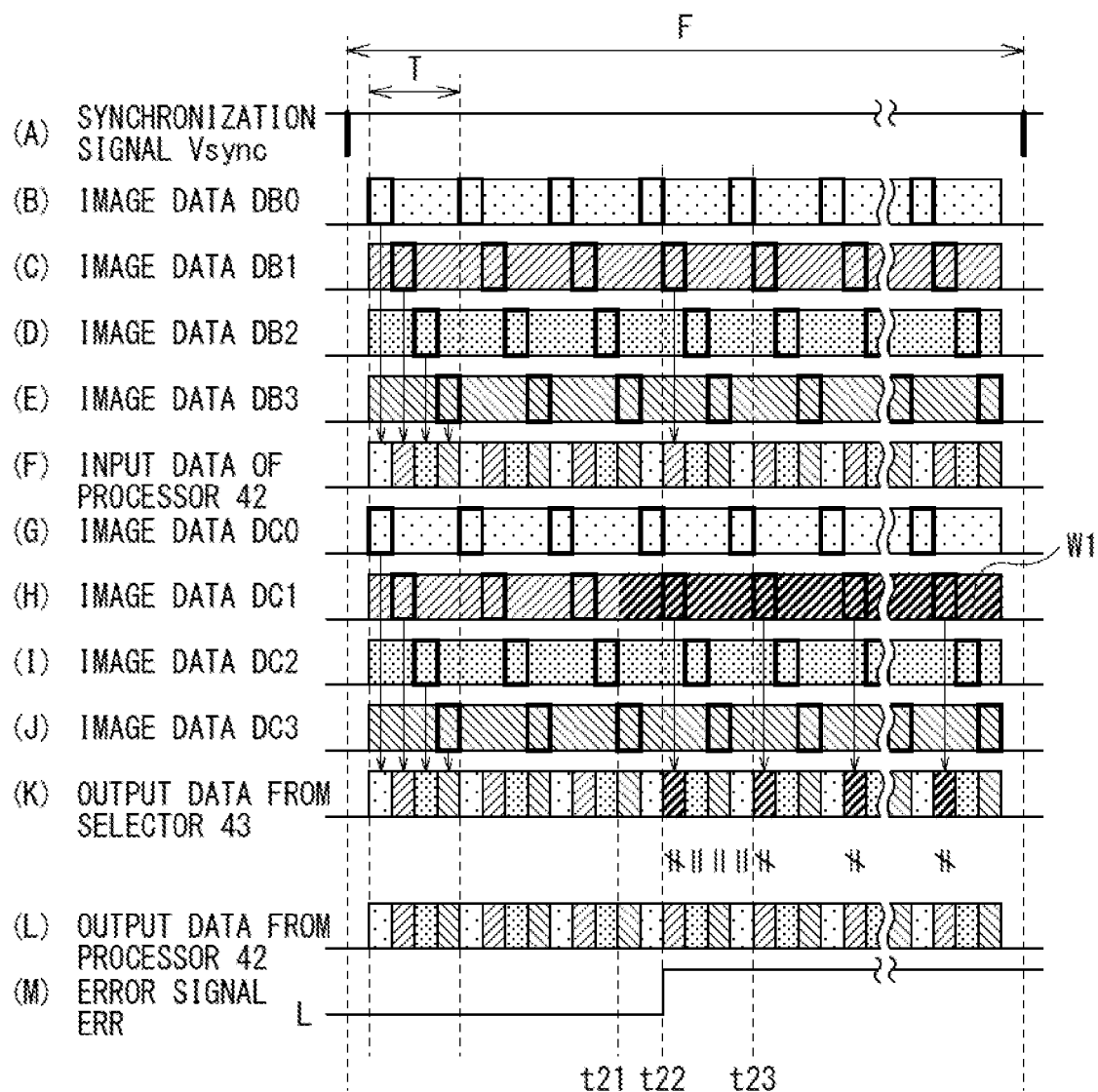

[ FIG. 10 ]
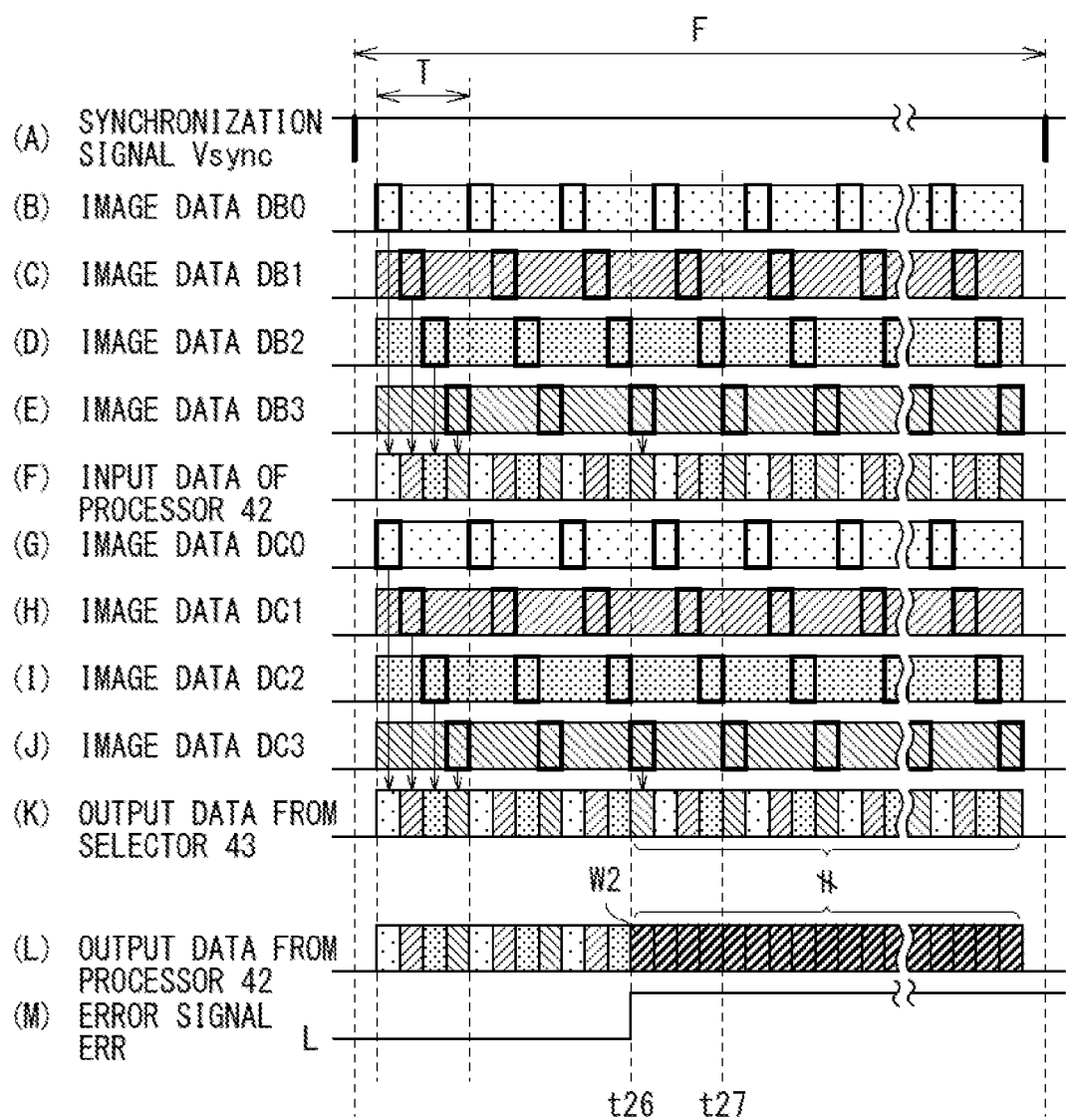

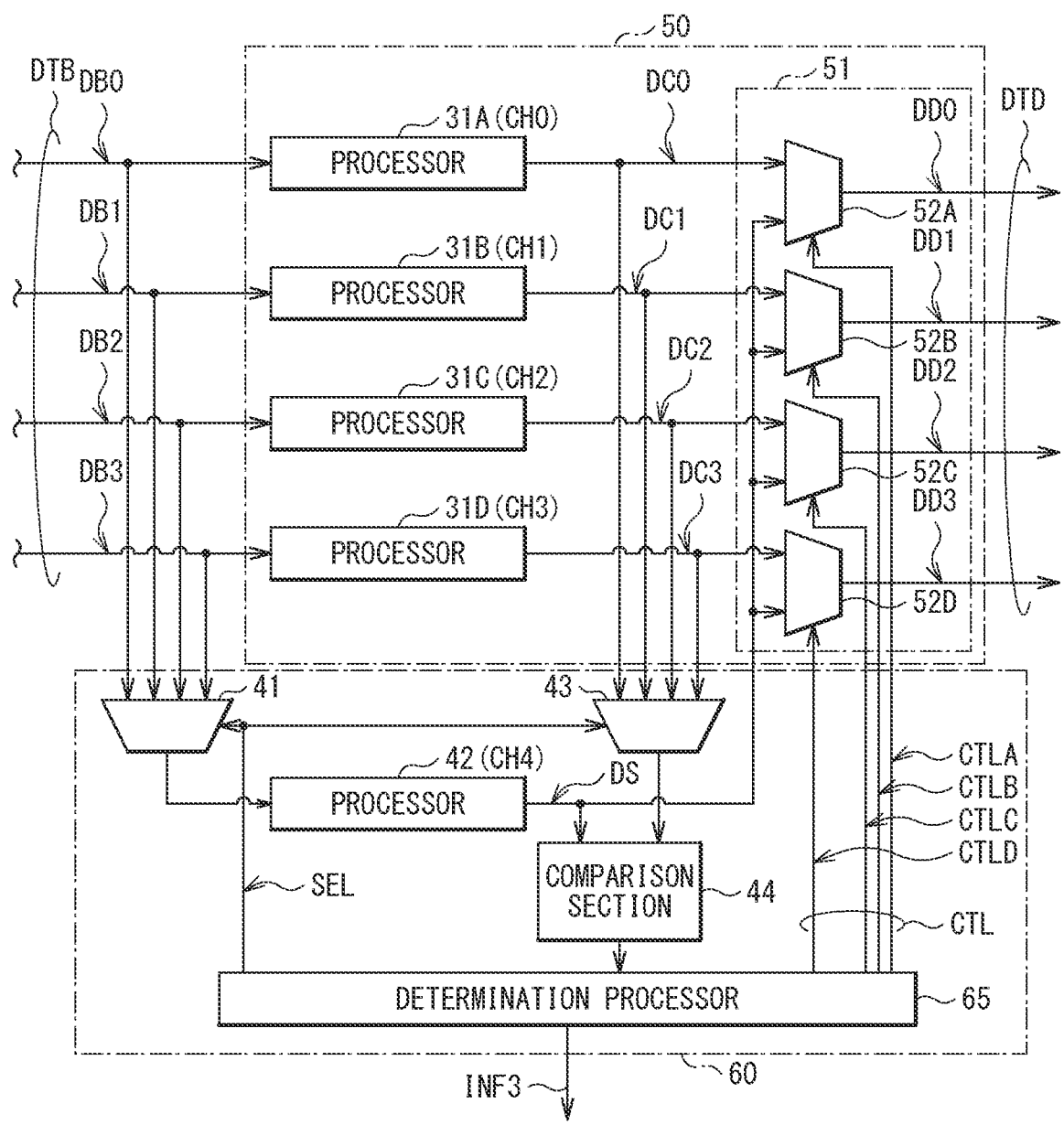
[FIG. 11]

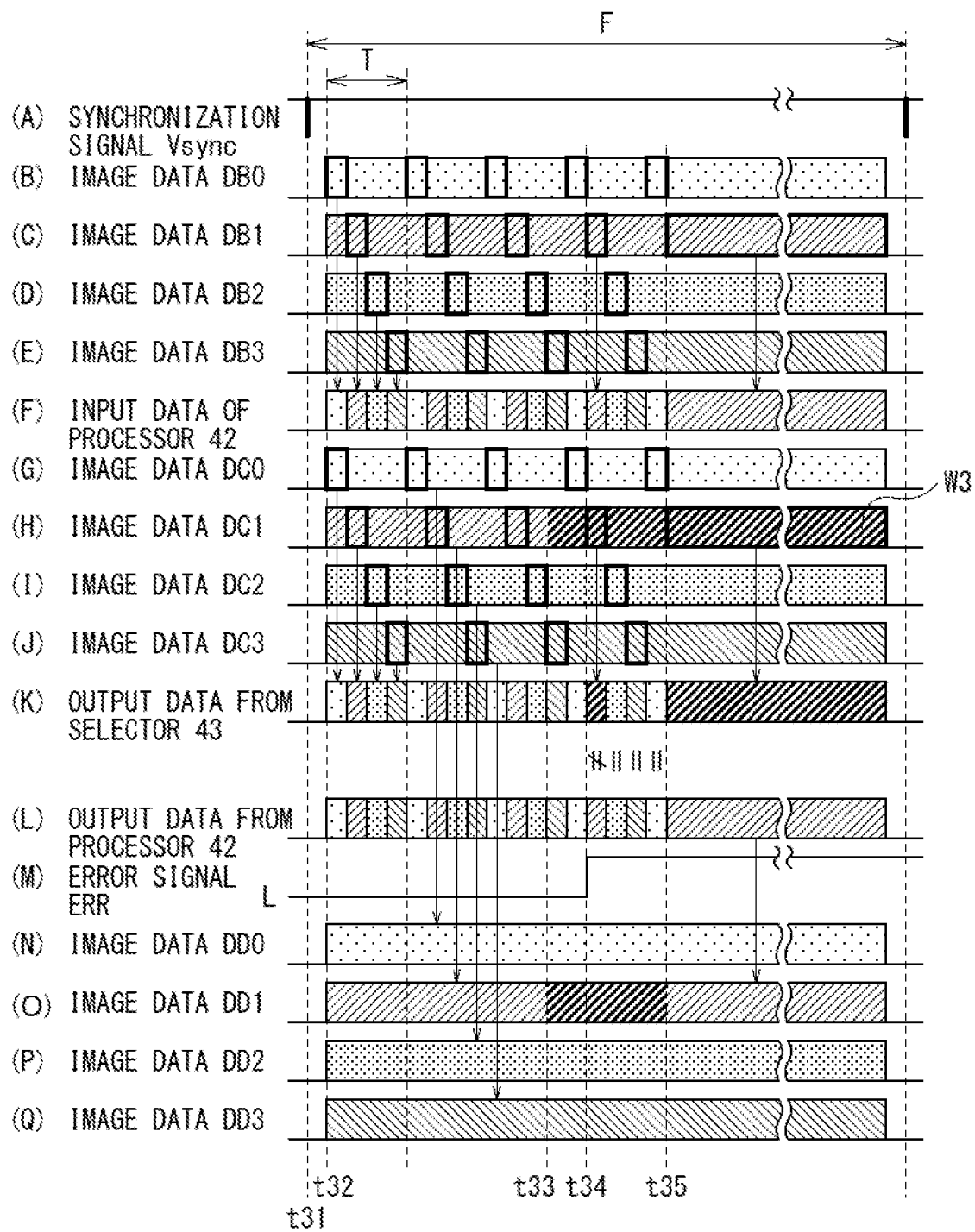
[FIG. 12]

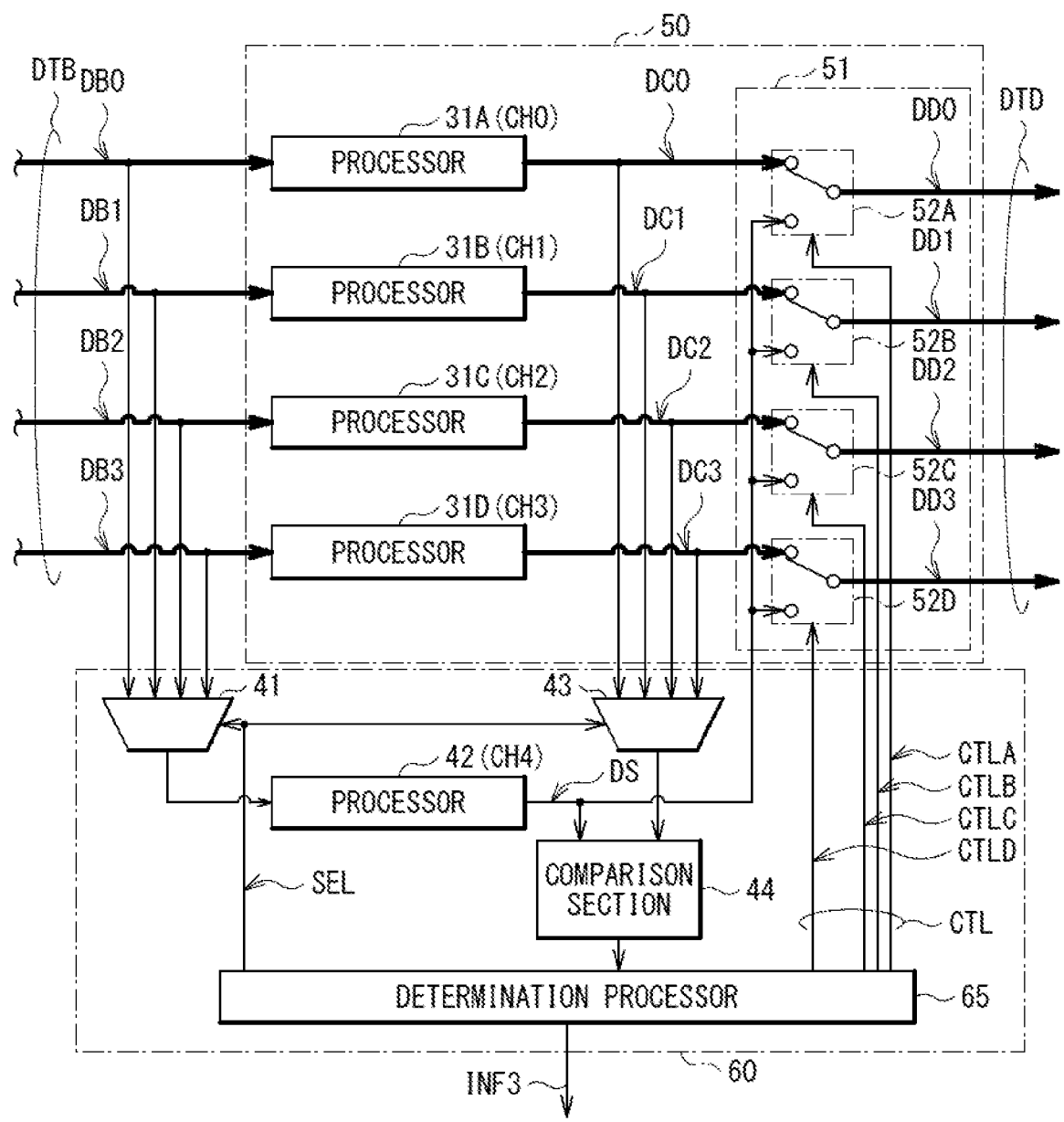
[ FIG. 13 ]

[ FIG. 14 ]
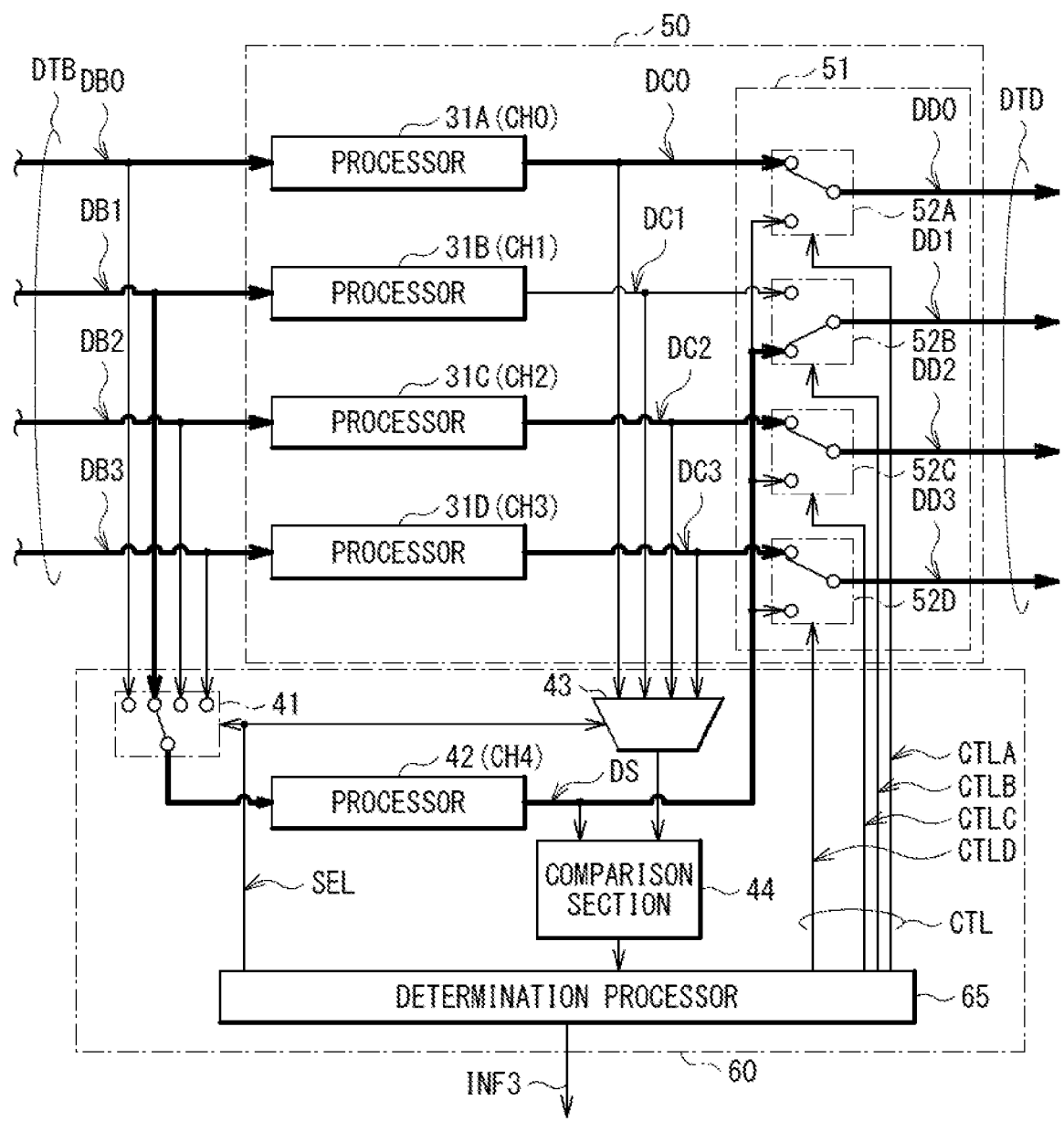

[FIG. 15]
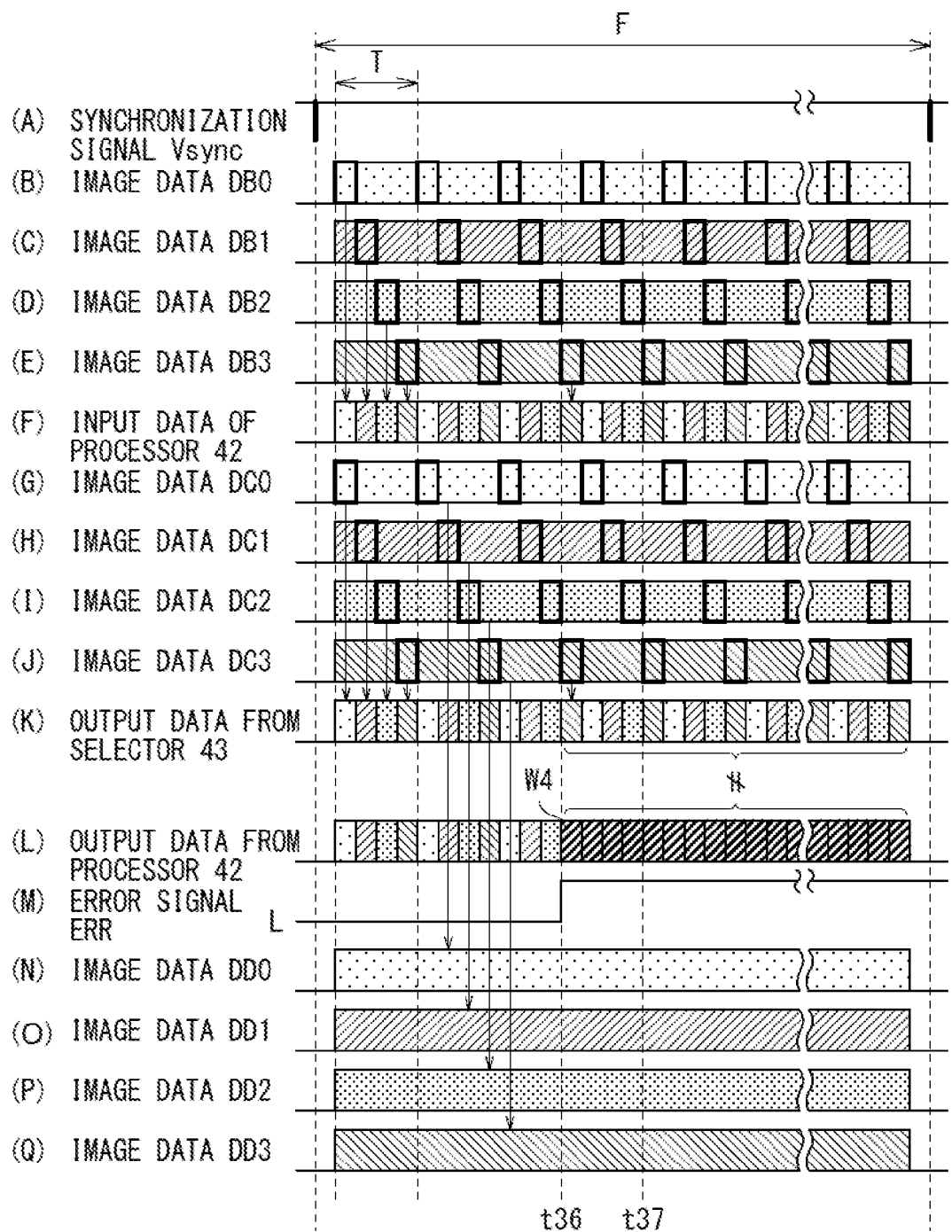

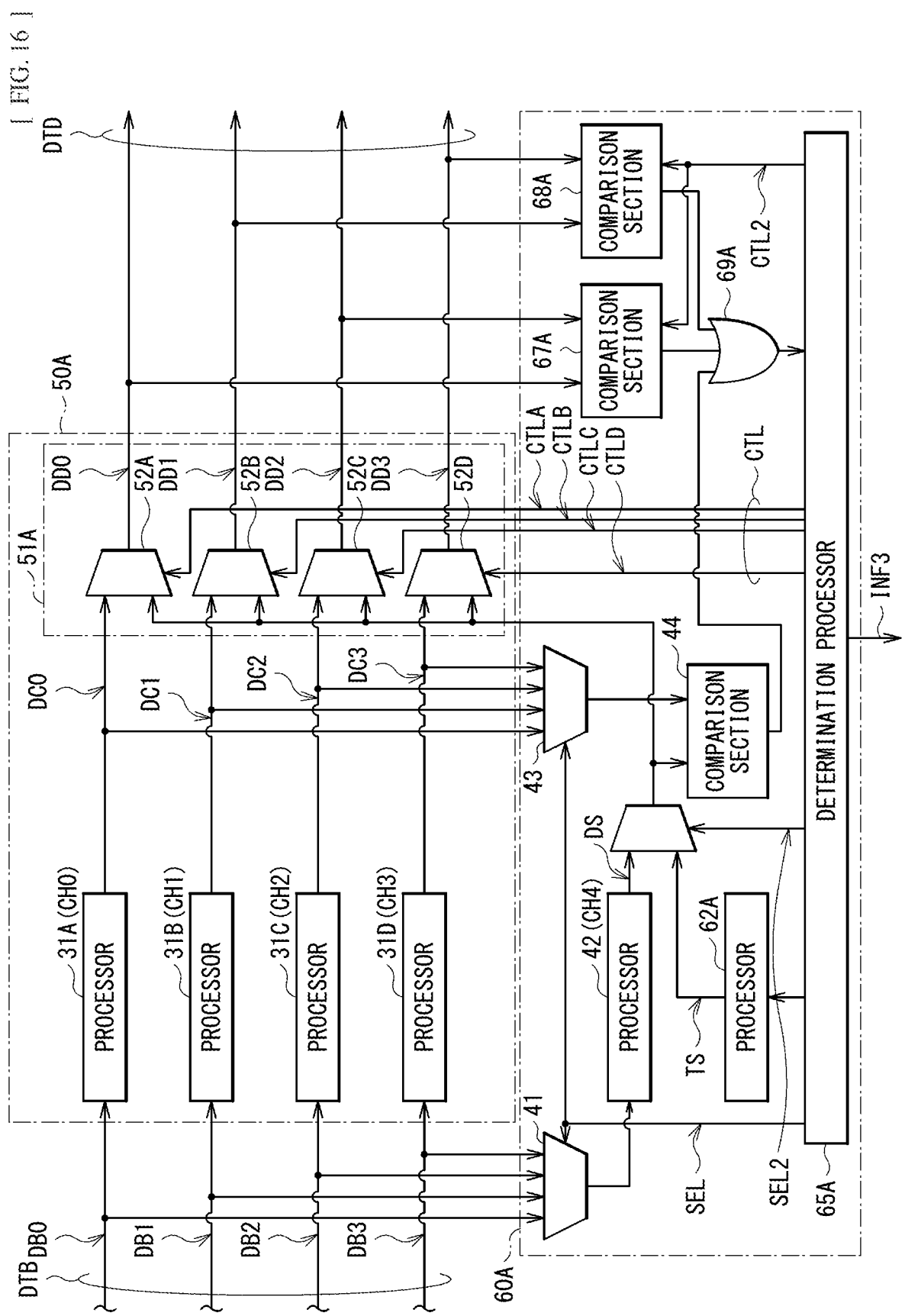
[FIG. 16]

[ FIG. 17 ]
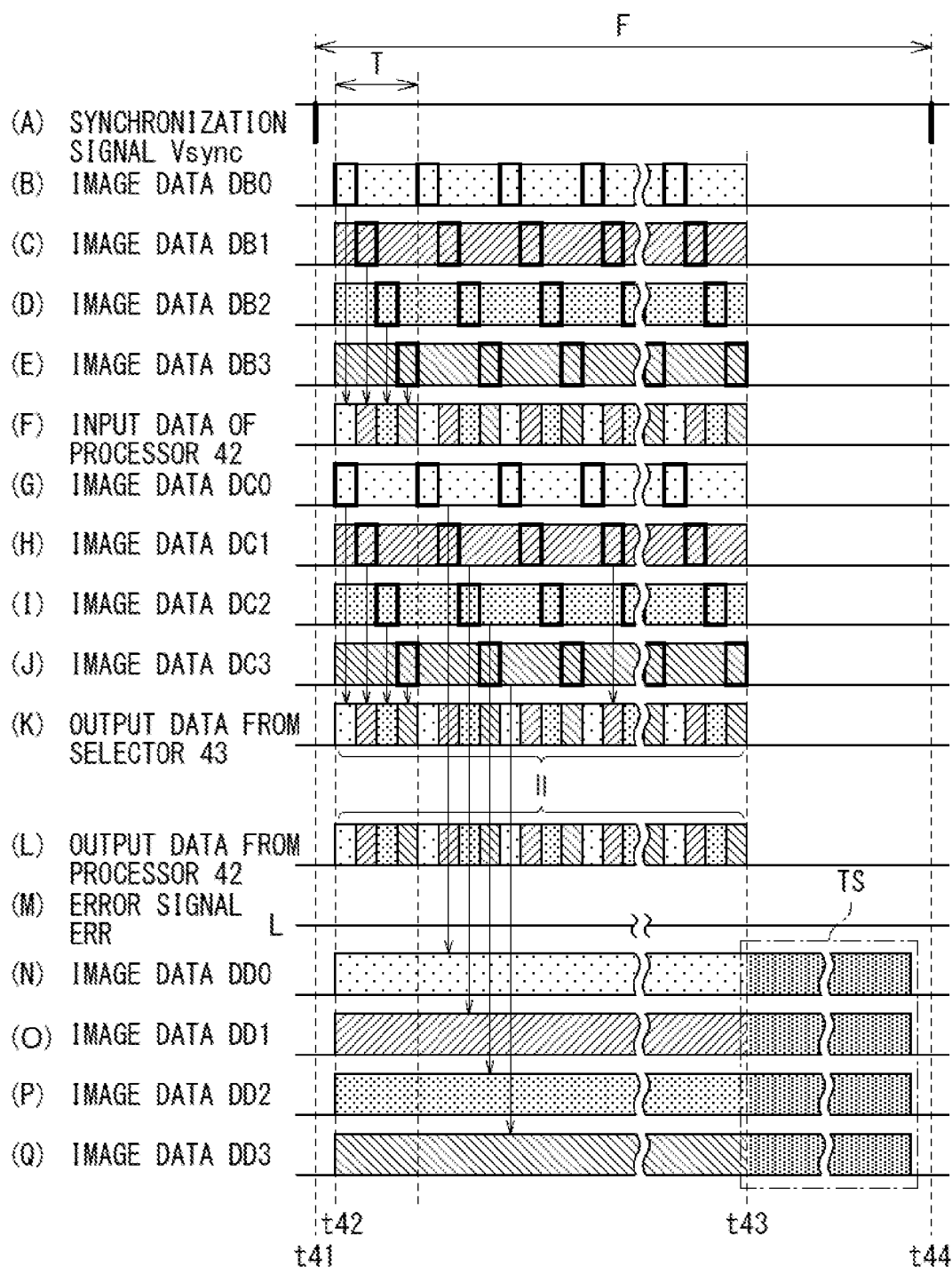

[FIG. 18]
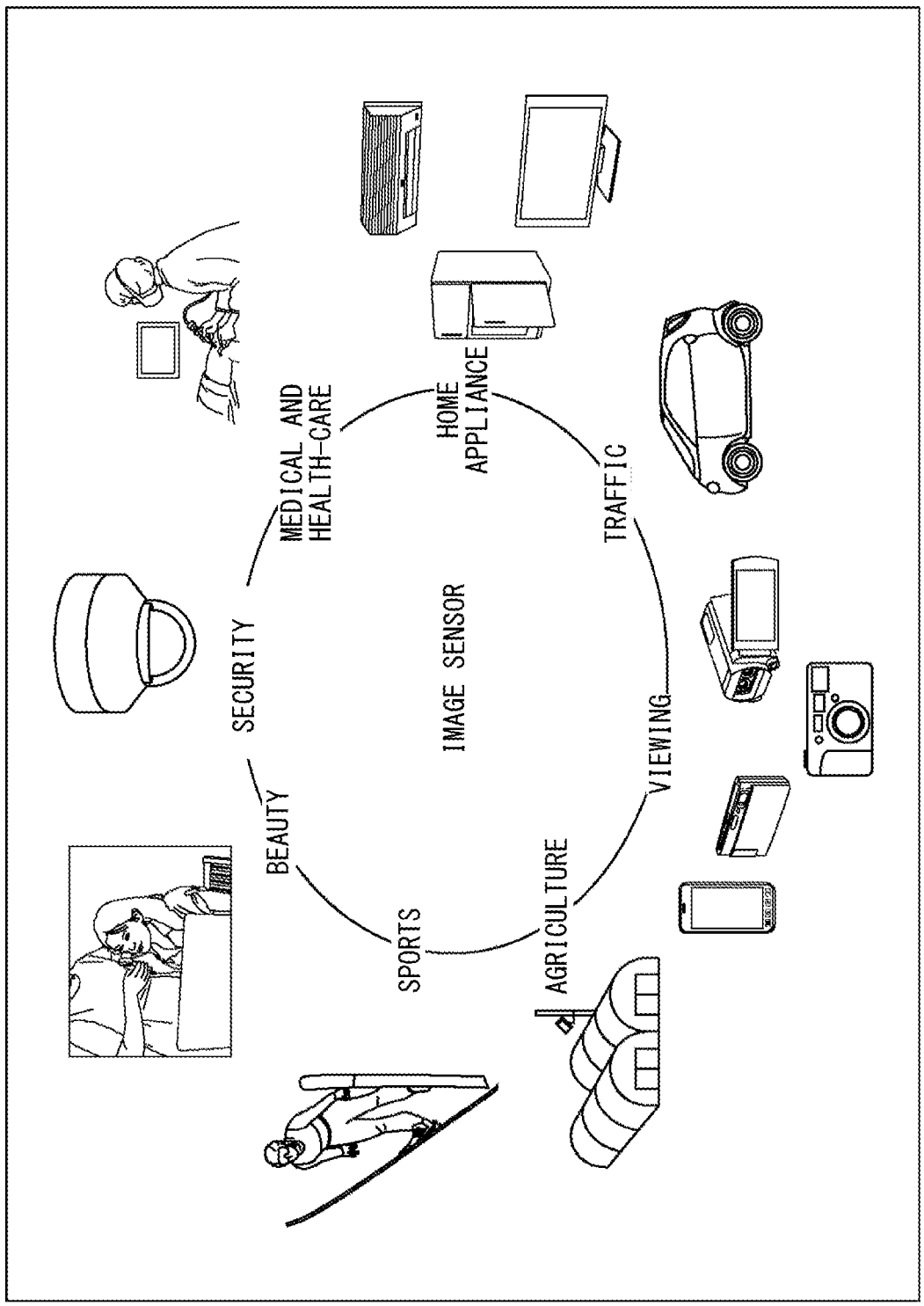

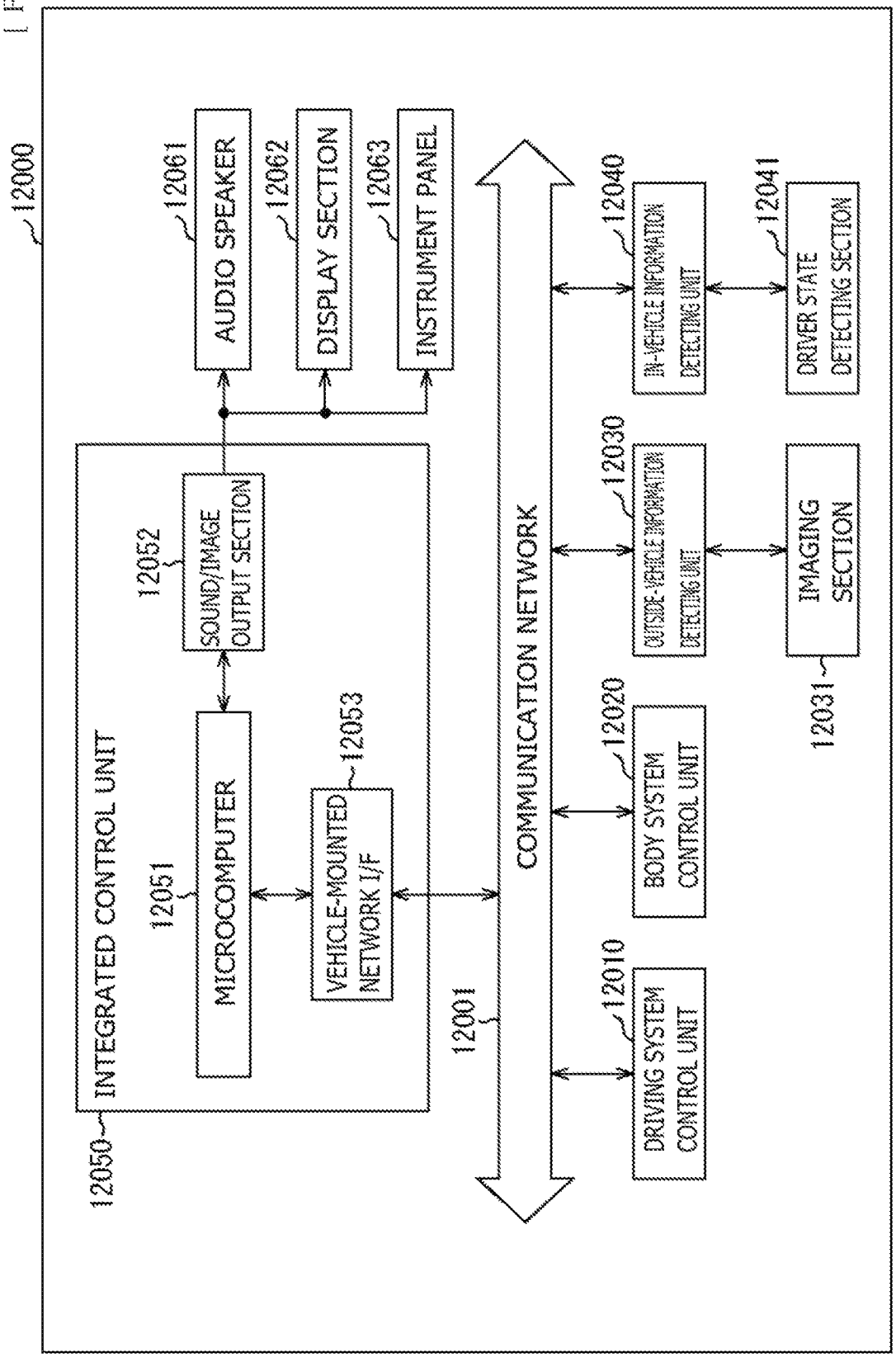
[FIG. 19]

[ FIG. 20 ]
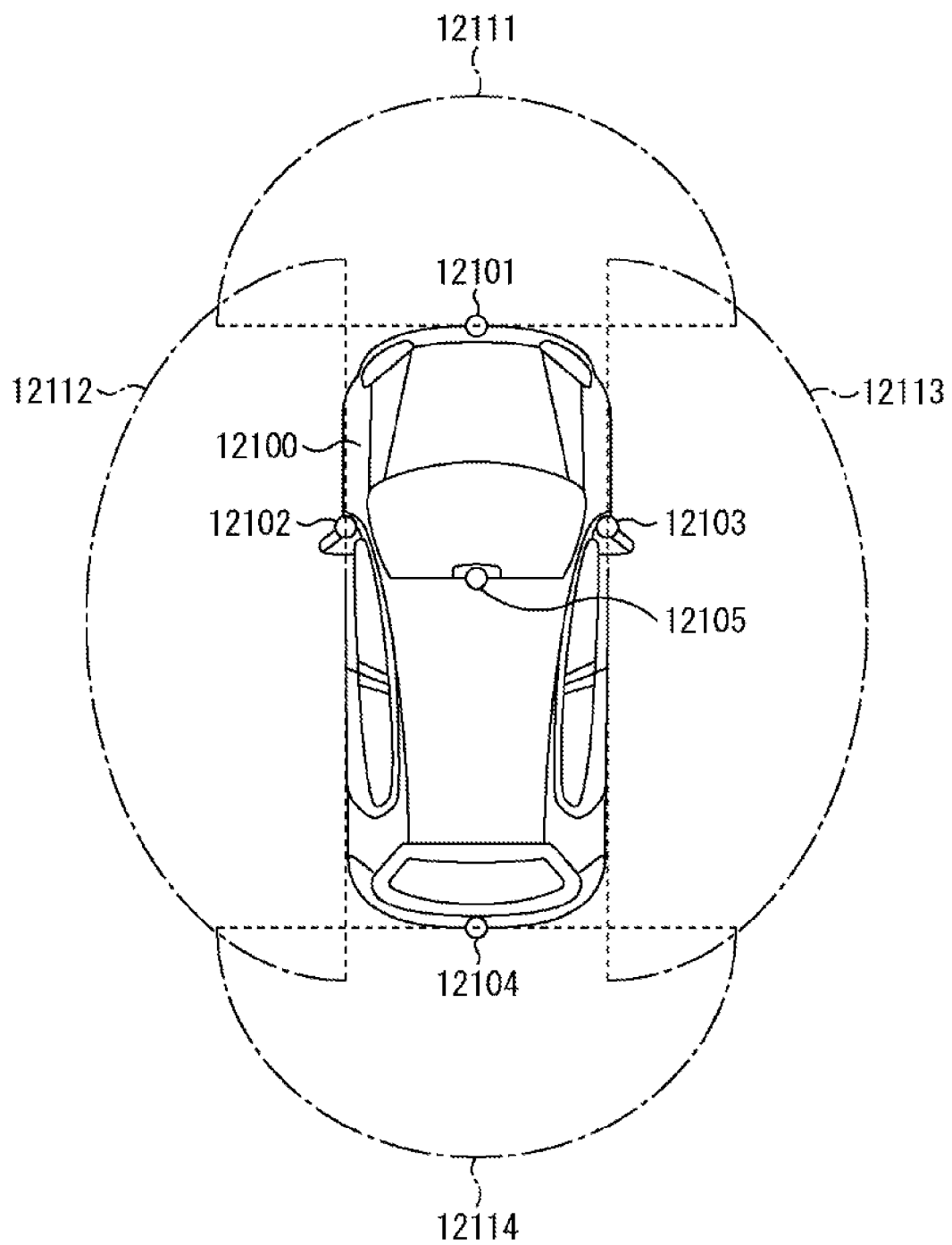

SIGNAL PROCESSING DEVICE, SIGNAL PROCESSING METHOD, AND IMAGING APPARATUS

TECHNICAL FIELD

The present disclosure relates to a signal processing device performing signal processing, a signal processing method used in such a signal processing device, and an imaging apparatus including such a signal processing device.

BACKGROUND ART

A signal processing device often uses two or more processors to perform processes in parallel. For example, PTL 1 discloses a technique of using test data to perform failure detection of two or more paths in a signal processing device that performs processes in parallel with use of the two or more paths.

CITATION LIST

Patent Literature

PTL 1: Japanese Unexamined Patent Application Publication No. 2019-4361

SUMMARY OF THE INVENTION

It is desired that a signal processing device configured to perform processes in parallel with use of two or more processors perform determination during normal operation.

It is desirable to provide a signal processing device, a signal processing method, and an imaging apparatus that make it possible to perform determination during normal operation.

A signal processing device according to an embodiment of the present disclosure includes two or more first processors, a controller, a first selection section, a second processor, a second selection section, and a first comparison section. The two or more first processors are provided in association with two or more first signals. The two or more first processors are each configured to perform a predetermined process on the basis of an associated first signal of the two or more first signals to thereby generate a second signal. The controller is configured to select any one of the two or more first processors and generate a selection control signal based on a result of the selection. The first selection section is configured to select the first signal to be supplied to the selected first processor, of the two or more first signals, on the basis of the selection control signal. The second processor is configured to perform the predetermined process on the basis of the first signal selected by the first selection section, of the two or more first signals, to thereby generate a third signal. The two or more second selection sections are each configured to select the second signal generated by the selected first processor, of the two or more second signals, on the basis of the selection control signal. The first comparison section is configured to compare the third signal and the second signal selected by the second selection section of the two or more second signals with each other.

A signal processing method according to an embodiment of the present disclosure includes: causing each of two or more first processors provided in association with two or more first signals to perform a predetermined process on the basis of an associated first signal of the two or more first signals to thereby generate a second signal; selecting any one of the two or more first processors and generating a selection control signal based on a result of the selecting; selecting the first signal to be supplied to the selected first processor, of the two or more first signals, on the basis of the selection control signal; causing a second processor to perform the predetermined process on the basis of the selected first signal of the two or more first signals to thereby generate a third signal; selecting the second signal generated by the selected first processor, of the two or more second signals, on the basis of the selection control signal; and comparing the third signal and the selected second signal of the two or more second signals with each other.

An imaging apparatus according to an embodiment of the present disclosure includes an imager, two or more first processors, a controller, a first selection section, a second processor, a second selection section, and a first comparison section. The imager is configured to perform imaging operation to thereby generate an image signal including two or more first signals. The two or more first processors are provided in association with the two or more first signals. The two or more first processors are each configured to perform a predetermined process on the basis of an associated first signal of the two or more first signals to thereby generate a second signal. The controller is configured to select any one of the two or more first processors and generate a selection control signal based on a result of the selection. The first selection section is configured to select the first signal to be supplied to the selected first processor, of the two or more first signals, on the basis of the selection control signal. The second processor is configured to perform the predetermined process on the basis of the first signal selected by the first selection section, of the two or more first signals, to thereby generate a third signal. The second selection section is configured to select the second signal generated by the selected first processor, of the two or more second signals, on the basis of the selection control signal. The first comparison section is configured to compare the third signal and the second signal selected by the second selection section of the two or more second signals with each other.

According to the signal processing device, the signal processing method, and the imaging apparatus of the embodiment of the present disclosure, the two or more first processors each perform the predetermined process on the basis of the associated first signal of the two or more first signals to thereby generate the second signal. Further, any one of the two or more first processors is selected, and the selection control signal based on the result of the selection is generated. Further, the first signal to be supplied to the selected first processor, of the two or more first signals, is selected on the basis of the selection control signal. The second processor performs the predetermined process on the basis of the selected first signal of the two or more first signals to thereby generate the third signal. The second signal generated by the selected first processor, of the two or more second signals, is selected on the basis of the selection control signal. Further, the third signal and the selected second signal of the two or more second signals are compared with each other.

BRIEF DESCRIPTION OF DRAWINGS

FIG. 1 is a block diagram illustrating a configuration example of an imaging apparatus according to an embodiment of the present disclosure.

FIG. 2 is an explanatory diagram illustrating a configuration example of a pixel array illustrated in FIG. 1.

FIG. 3 is a block diagram illustrating a specific example of an image processing unit and a determination unit according to a first embodiment.

FIG. 4 is an explanatory diagram illustrating an example of image data supplied to the image processing unit illustrated in FIG. 3.

FIG. 5 is another explanatory diagram illustrating an example of the image data supplied to the image processing unit illustrated in FIG. 3.

FIG. 6 is an explanatory diagram illustrating an example of a transfer format of transmission data transmitted from the imaging apparatus illustrated in FIG. 1.

FIG. 7 is a timing waveform diagram illustrating an operation example of the image processing unit and the determination unit illustrated in FIG. 3.

FIG. 8 is another timing waveform diagram illustrating an operation example of the image processing unit and the determination unit illustrated in FIG. 3.

FIG. 9 is another timing waveform diagram illustrating an operation example of the image processing unit and the determination unit illustrated in FIG. 3.

FIG. 10 is another timing waveform diagram illustrating an operation example of the image processing unit and the determination unit illustrated in FIG. 3.

FIG. 11 is a block diagram illustrating a specific example of an image processing unit and a determination unit according to a second embodiment.

FIG. 12 is a timing waveform diagram illustrating an operation example of the image processing unit and the determination unit illustrated in FIG. 11.

FIG. 13 is an explanatory diagram illustrating an example of an operation state of the image processing unit and the determination unit illustrated in FIG. 11.

FIG. 14 is an explanatory diagram illustrating another example of the operation state of the image processing unit and the determination unit illustrated in FIG. 11.

FIG. 15 is another timing waveform diagram illustrating an operation example of the image processing unit and the determination unit illustrated in FIG. 11.

FIG. 16 is a block diagram illustrating a specific example of an image processing unit and a determination unit according to a modification of the second embodiment.

FIG. 17 is a timing waveform diagram illustrating an operation example of the image processing unit and the determination unit illustrated in FIG. 16.

FIG. 18 is an explanatory diagram illustrating examples of use of the imaging apparatus.

FIG. 19 is a block diagram depicting an example of schematic configuration of a vehicle control system.

FIG. 20 is a diagram of assistance in explaining an example of installation positions of an outside-vehicle information detecting section and an imaging section.

MODES FOR CARRYING OUT THE INVENTION

Embodiments of the present disclosure are described below in detail with reference to the drawings. Note that the description is given in the following order.
1. First Embodiment
2. Second Embodiment
3. Examples of Use of Imaging Apparatus
4. Examples of Application to Mobile Bodies

1. First Embodiment

[Configuration Example]

FIG. 1 illustrates a configuration example of an imaging apparatus 1 including a signal processing device according to an embodiment. Note that a signal processing method and an imaging apparatus according to an embodiment of the present disclosure are described together because they are implemented by the present embodiment. The imaging apparatus 1 includes an imager 10, a sensor interface 21, a determination unit 22, an image processing unit 30, a determination unit 40, a transmission data generation unit 23, a determination unit 24, a transmission unit 25, a determination result collection unit 26, a register 27, and a communication unit 28.

The imager 10 is configured to perform imaging operation to thereby generate image data DTA. The imager 10 includes a pixel array 11, an AD converter 12, and a determination unit 13.

The pixel array 11 includes a plurality of pixels P disposed in a matrix. The pixel P is configured to include a photodiode that performs photoelectric conversion, and is configured to generate a pixel voltage based on a light reception amount.

FIG. 2 illustrates a configuration example of the pixel array 11. The plurality of pixels P is disposed on the basis of a unit (a unit U) of four pixels P arranged in two rows and two columns. The unit U includes four pixels PR, PGr, PGb, and PB. The pixel PR is configured to receive red light, the pixels PGr and PGb are configured to receive green light, and the pixel PB is configured to receive blue light. In this example, in the unit U, the pixel PR is disposed on the upper left, the pixel PGr is disposed on the upper right, the pixel PGb is disposed on the lower left, and the pixel PB is disposed on the lower right. Thus, in the pixel array 11, the pixels PR, PGr, PGb, and PB are disposed in a so-called Bayer array.

The AD converter 12 (FIG. 1) is configured to perform AD conversion on the basis of a pixel voltage supplied from each of the pixels P to thereby generate a pixel value which is a digital value. Further, the AD converter 12 sequentially supplies the generated pixel values to the sensor interface 21 with use of the image data DTA on the basis of a unit of pixel values for one frame.

The determination unit 13 is configured to perform a determination process with respect to the AD converter 12 to thereby detect a malfunction of the AD converter 12. Further, the determination unit 13 notifies the determination result collection unit 26 of determination data INF1 indicating a determination result regarding the AD converter 12.

The sensor interface 21 is an interface between the imager 10 and the image processing unit 30. The sensor interface 21 is configured to supply, to the image processing unit 30, image data DTB based on the image data DTA supplied from the imager 10.

The determination unit 22 is configured to perform a determination process with respect to the sensor interface 21 to thereby detect a malfunction of the sensor interface 21. Further, the determination unit 22 notifies the determination result collection unit 26 of determination data INF2 indicating a determination result regarding the sensor interface 21.

The image processing unit 30 is configured to perform predetermined image processing on the basis of the image data DTB supplied from the sensor interface 21 to thereby generate image data DTC. The predetermined image processing includes, for example, at least one of a gain adjustment process, a white balance adjustment process, a black level adjustment process, an HDR (High Dynamic Range) synthesis process, a noise removal process, or a pixel defect correction process.

The determination unit 40 is configured to perform a determination process with respect to the image processing unit 30 to thereby detect a malfunction of the image processing unit 30. Further, the determination unit 40 notifies the determination result collection unit 26 of determination data INF3 indicating a determination result regarding the image processing unit 30.

FIG. 3 illustrates a configuration example of the image processing unit 30 and the determination unit 40. The image data DTB supplied to the image processing unit 30, the image data DTB includes four pieces of image data DB (pieces of image data DB0 to DB3). The image data DTC generated by the image processing unit 30 includes four pieces of image data DC (pieces of image data DC0 to DC3).

FIG. 4 illustrates an example of the pieces of image data DB0, DB1, DB2, and DB3. FIG. 5 illustrates an example of the image data DB0.

As illustrated in FIG. 4, the image data DB0 includes a plurality of pixel values related to the red pixels PR. Specifically, as illustrated in FIG. 5, the image data DB0 includes line image data DB_R0 including pixel values of two or more pixels PR related to the zeroth line L, line image data DB_R2 including pixel values of two or more pixels PR related to the second line L, line image data DB_R4 including pixel values of two or more pixels PR related to the fourth line L, line image data DB_R6 including pixel values of two or more pixels PR related to the sixth line L. and so on.

In a similar manner, as illustrated in FIG. 4, the image data DB1 includes a plurality of pixel values related to the green pixels PGr. Specifically, the image data DB1 includes line image data DB_Gr0 including pixel values of two or more pixels PGr related to the zeroth line L, line image data DB_Gr2 including pixel values of two or more pixels PGr related to the second line L, line image data DB_Gr4 including pixel values of two or more pixels PGr related to the fourth line L, line image data DB_Gr6 including pixel values of two or more pixels PGr related to the sixth line L, and so on.

In a similar manner, as illustrated in FIG. 4, the image data DB2 includes a plurality of pixel values related to the green pixels PGb. Specifically, the image data DB2 includes line image data DB_Gb1 including pixel values of two or more pixels PGb related to the first line L, line image data DB_Gb3 including pixel values of two or more pixels PGb related to the third line L, line image data DB_Gb5 including pixel values of two or more pixels PGb related to the fifth line L, line image data DB_Gb7 including pixel values of two or more pixels PGb related to the seventh line L, and so on.

In a similar manner, as illustrated in FIG. 4, the image data DB3 includes a plurality of pixel values related to the blue pixels PB. Specifically, the image data DB3 includes line image data DB_B1 including pixel values of two or more pixels PB related to the first line L, line image data DB_B3 including pixel values of two or more pixels PB related to the third line L, line image data DB_B5 including pixel values of two or more pixels PB related to the fifth line L, line image data DB_B7 including pixel values of two or more pixels PB related to the seventh line L, and so on.

As illustrated in FIG. 3, the image processing unit 30 has four processors 31 (processors 31A, 31B, 31C, and 31D). The four processors 31 have respective circuit configurations that are the same as each other and are configured to perform image processing in manners similar to each other. The processor 31A is configured to perform predetermined image processing on the basis of the image data DB0 to thereby generate image data DC0. The processor 31B is configured to perform predetermined image processing on the basis of the image data DB1 to thereby generate image data DC1. The processor 31C is configured to perform predetermined image processing on the basis of the image data DB2 to thereby generate image data DC2. The processor 31D is configured to perform predetermined image processing on the basis of the image data DB3 to thereby generate image data DC3. With this configuration, the image processing unit 30 performs the image processing in a parallel manner. Hereinafter, the processors 31A. 31B, 31C, and 31D are also referred to as channels CH0, CH1, CH2, and CH3 as appropriate.

The determination unit 40 includes a selector 41, a processor 42, a selector 43, a comparison section 44, and a determination processor 45.

The selector 41 is configured to select any one of the pieces of image data DB0 to DB3 on the basis of the selection control signal SEL, and supply the selected image data DB to the processor 42.

The processor 42 has the same circuit configuration as each of the four processors 31 of the image processing unit 30. The processor 42 is configured to perform predetermined image processing on the basis of the image data DB supplied from the selector 41 to thereby generate image data DS. Hereinafter, the processor 42 is also referred to as a channel CH4 as appropriate.

The selector 43 is configured to select any one of the pieces of image data DC0 to DC3 on the basis of the selection control signal SEL, and supply the selected image data DC to the comparison section 44.

The comparison section 44 is configured to compare the image data DS generated by the processor 42 and the image data DC supplied from the selector 43 with each other, and supply a result of the comparison to the determination processor 45.

The determination processor 45 is configured to control a determination process for the image processing unit 30. Specifically, the determination processor 45 generates a selection control signal SEL giving an instruction to select any one of the processors 31A to 31D (the channels CH0 to CH3) in the image processing unit 30. For example, the determination processor 45 so generates the selection control signals SEL that the processors 31A, 31B, 31C, and 31D are sequentially and cyclically selected in this order. Further, the determination processor 45 determines which processor of the processors 31A to 31D and 42 (the channels CH0 to CH4) is malfunctioning on the basis of a comparison result obtained by the comparison section 44 in a case where the processor 31A (the channel CH0) is selected, a comparison result obtained by the comparison section 44 in a case where the processor 31B (the channel CH1) is selected, a comparison result obtained by the comparison section 44 in a case where the processor 31C (the channel CH2) is selected, and a comparison result obtained by the comparison section 44 in a case where the processor 31D (the channel CH3) is selected. Further, the determination processor 45 notifies the determination result collection unit 26 of determination data INF3 indicating a result of the determination regarding the image processing unit 30. The determination data INF3 includes, for example, data regarding whether or not the image processing unit 30 and the determination unit 40 are malfunctioning. Further, the determination data INF3 includes detailed determination data such as which of the processors 31A to 31D and 42 (the channels CH0 to CH4) is malfunctioning.

With this configuration, in the image processing unit 30, the four processors 31A to 31D (the channels CH0 to CH3) perform image processing on the basis of the pieces of image data DB0 to DB3. The determination processor 45 sequentially selects one of the four processors 31A to 31D in a time-division manner, and the selector 41 supplies the image data DB inputted to the selected processor 31 to the processor 42 (the channel CH4) of the determination unit 40. The processor 42 performs image processing on the basis of the image data DB supplied from the selector 41 to thereby generate image data DS. The selector 43 supplies the image data DC generated by the selected processor 31 to the comparison section 44. The comparison section 44 compares the image data DS supplied from the processor 42 and the image data DC supplied from the selector 43 with each other. In a case where the image processing unit 30 and the determination unit 40 are not malfunctioning, these pieces of image data are expected to match each other. Further, the determination processor 45 detects a malfunction in the image processing unit 30 on the basis of the comparison result obtained by the comparison section 44.

The transmission data generation unit 23 (FIG. 1) is configured to generate transmission data DT having a predetermined transmission format on the basis of the image data DTC. Further, the transmission data generation unit 23 is able to embed data supplied from the register 27 into the transmission data DT.

The determination unit 24 is configured to perform a determination process with respect to the transmission data generation unit 23 to thereby detect a malfunction of the transmission data generation unit 23. Further, the determination unit 24 notifies the determination result collection unit 26 of determination data INF4 indicating a determination result regarding the transmission data generation unit 23.

The transmission unit 25 is configured to transmit the transmission data DT supplied from the transmission data generation unit 23 to a host device 100 (not illustrated), for example, via a high-speed interface such as an MIPI (Mobile Industry Processor Interface).

The determination result collection unit 26 is configured to collect the pieces of determination data INF1 to INF4 supplied from the determination units 13, 22, 40, and 24 and to store determination data INF indicating detailed determination result based on the pieces of determination data INF1 to INF4 in the register 27. Further, the determination result collection unit 26 generates, on the basis of the pieces of determination data INF1 to INF4, an error signal ERR indicating whether or not the imaging apparatus 1 is malfunctioning, and outputs the error signal ERR.

The register 27 is configured to hold the determination data INF. The data stored in the register 27 is readable by an external device such as the host device 100 (not illustrated) via the communication unit 28. Further, the register 27 is able to supply the determination data INF to the transmission data generation unit 23. In this case, the transmission data generation unit 23 is to embed the determination data INF into the transmission data DT.

The communication unit 28 is configured to communicate with an external device such as the host device 100 (not illustrated), for example, via a low-speed interface such as an 12C.

FIG. 6 illustrates an example of a transfer format of the transmission data DT. Data from a frame start FS to a frame end FE represents image data for one frame. The transmission data generation unit 23 generates a plurality of packets PCT on the basis of the image data DTC to thereby generate transmission data DT for one frame.

As illustrated in (A) of FIG. 6, the imaging apparatus 1 transmits image data in an image region A. The image region A includes an effective pixel region A1 and dummy regions A2 and A3. The effective pixel region A1 is an image region corresponding to a region where so-called effective pixels are disposed in the pixel array 11. The dummy region A2 is provided on the upper side of the effective pixel region A1, and the dummy region A3 is provided on the lower side of the effective pixel region A1. In a case of embedding the determination data INF into the transmission data DT, the transmission data generation unit 23 is allowed to insert the determination data INF, for example, into the dummy region A2 or the dummy region A3.

As illustrated in (B) of FIG. 6, a single packet PCT includes a header PH, a payload PP, and a footer PF. The payload PP includes image data for one line in the image region A. Therefore, the imaging apparatus 1 is able to transmit the image data in the image region A with use of the same number of packets PCT as the number of pixels in the image region A in an upper-lower direction. Thus, the imaging apparatus 1 transmits the image data for one frame on a line-unit basis.

Here, the processors 31A to 31D correspond to a specific example of "two or more first processors" in the present disclosure. The pieces of image data DB0 to DB3 correspond to a specific example of "two or more first signals" in the present disclosure. The pieces of image data DC0 to DC3 correspond to a specific example of "two or more second signals" in the present disclosure. The determination processor 45 corresponds to a specific example of a "controller" in the present disclosure. The selector 41 corresponds to a specific example of a "first selection section" in the present disclosure. The processor 42 corresponds to a specific example of a "second processor" in the present disclosure. The image data DS corresponds to a specific example of a "third signal" in the present disclosure. The selector 43 corresponds to a specific example of a "second selection section" in the present disclosure. The comparison section 44 corresponds to a specific example of a "first comparison section" in the present disclosure. The determination result collection unit 26 corresponds to a specific example of an "output unit" in the present disclosure. The imager 10 and the sensor interface 21 correspond to a specific example of an "imager" in the present disclosure.

[Operation and Workings]

Next, operation and workings of the imaging apparatus 1 according to the present embodiment are described.

(Outline of Overall Operation)

First, an outline of overall operation of the imaging apparatus 1 is described with reference to FIG. 1. The imager 10 performs imaging operation to generate image data DTA. Specifically, each of the pixels P of the pixel array 11 generates a pixel voltage based on a light reception amount. The AD converter 12 performs AD conversion on the basis of the pixel voltage supplied from each of the pixels P to thereby generate a pixel value which is a digital value. The determination unit 13 performs a determination process with respect to the AD converter 12, and notifies the determination result collection unit 26 of determination data INF1 indicating a determination result regarding the AD converter 12. The sensor interface 21 supplies, to the image processing unit 30, image data DTB based on the image data DTA supplied from the imager 10. The determination unit 22 performs a determination process with respect to the sensor interface 21, and notifies the determination result collection unit 26 of determination data INF2 indicating a determination result regarding the sensor interface 21. The image processing unit 30 performs predetermined image processing on the basis of the image data DTB supplied from the sensor interface 21 to thereby generate image data DTC. The determination unit 40 performs a determination process with respect to the image processing unit 30, and notifies the determination result collection unit 26 of determination data INF3 indicating a determination result regarding the image processing unit 30. The transmission data generation unit 23 generates transmission data DT having a predetermined transfer format on the basis of the image data DTC. The determination unit 24 performs a determination process with respect to the transmission data generation unit 23, and notifies the determination result collection unit 26 of determination data INF4 indicating a determination result regarding the transmission data generation unit 23. The transmission unit 25 transmits, to the host device 100 (not illustrated), the transmission data DT supplied from the transmission data generation unit 23. The determination result collection unit 26 collects the pieces of determination data INF1 to INF4 supplied from the determination units 13, 22, 40, and 24, and stores, in the register 27, determination data INF indicating detailed determination result based on the pieces of determination data INF1 to INF4. Further, the determination result collection unit 26 generates, on the basis of the pieces of determination data INF1 to INF4, an error signal ERR indicating whether or not the imaging apparatus 1 is malfunctioning, and outputs the error signal ERR. The register 27 holds the determination data INF. The communication unit 28 communicates with an external device such as the host device 100 (not illustrated).

(Detailed Operation)

FIG. 7 illustrates an operation example of the image processing unit 30 and the determination unit 40 in a case where the imaging apparatus 1 is not malfunctioning. FIG. 8 illustrates a portion W in FIG. 7 in detail. (A) of FIG. 7 illustrates a waveform of a synchronization signal Vsync. (B) to (E) thereof illustrate the pieces of image data DB0 to DB3 inputted to the processors 31A to 31D of the image processing unit 30, respectively. (F) thereof illustrates the image data DB inputted to the processor 42 of the determination unit 40. (G) to (J) thereof illustrate the pieces of image data DC0 to DC3 generated by the processors 31A to 31D, respectively. (K) thereof illustrates the image data DC outputted from the selector 43. (L) thereof illustrates the image data DS generated by the processor 42. (M) thereof illustrates a waveform of the error signal ERR outputted from the imaging apparatus 1. (A) of FIG. 8 illustrates the selection control signal SEL. (B) to (M) of FIG. 8 are similar to (B) to (M) of FIG. 7. In (B) to (E) of FIG. 7 and (B) to (E) of FIG. 8, portions indicated by bold lines represent image data supplied to the processor 42. In (G) to (J) of FIG. 7 and (G) to (J) of FIG. 8, portions indicated by bold lines represent image data supplied to the comparison section 44. In this example, the error signal ERR is a signal that is at a low level in a case where the imaging apparatus 1 is not malfunctioning and is at a high level in a case where the imaging apparatus 1 is malfunctioning. Note that the error signal ERR is not limited thereto, and may be a signal that is at a high level in the case where the imaging apparatus 1 is not malfunctioning and is at a low level in the case where the imaging apparatus 1 is malfunctioning, for example.

In the image processing unit 30, the four processors 31A to 31D (the channels CH0 to CH3) perform image processing on the basis of the pieces of image data DB0 to DB3 to thereby generate the pieces of image data DC0 to DC3. The determination processor 45 sequentially selects one of the four processors 31A to 31D in a time-division manner. The selector 41 supplies the image data DB inputted to the selected processor 31 to the processor 42 (the channel CH4) of the determination unit 40. The processor 42 performs image processing on the basis of the image data DB supplied from the selector 41 to thereby generate the image data DS. The selector 43 supplies the image data DC generated by the selected processor 31 to the comparison section 44. The comparison section 44 compares the image data DS supplied from the processor 42 and the image data DC supplied from the selector 43 with each other. Further, the determination processor 45 detects a malfunction in the image processing unit 30 on the basis of the comparison result obtained by the comparison section 44. This operation is described below in detail.

As illustrated in FIG. 7, at a timing t1, a pulse is generated in the synchronization signal Vsync, and a frame period F is thereby started ((A) of FIG. 7). As illustrated in FIG. 8, in this frame period F, the processor 31A (the channel CH0) performs image processing on the basis of the image data DB0 (the pieces of line image data DB_R0, DB_R2, DB_R4, DB_R6, and so on) to thereby generate the image data DC0 (the pieces of line image data DC_R0, DC_R2, DC_R4, DC_R6, and so on) ((B) and (G) of FIG. 8). In this frame period F, the processor 31B (the channel CH1) performs image processing on the basis of the image data DB1 (the pieces of line image data DB_Gr0, DB_Gr2, DB_Gr4, DB_Gr6, and so on) to thereby generate the image data DC1 (the pieces of line image data DC_Gr0, DC_Gr2, DC_Gr4, DC_Gr6, and so on) ((C) and (H) of FIG. 8). In this frame period F, the processor 31C (the channel CH2) performs image processing on the basis of the image data DB2 (the pieces of line image data DB_Gb1, DB_Gb3, DB_Gb5, DB_Gb7, and so on) to thereby generate the image data DC2 (the pieces of line image data DC_Gb1, DC_Gb3, DC_Gb5, DC_Gb7, and so on) ((D) and (I) of FIG. 8). In this frame period F, the processor 31D (the channel CH3) performs image processing on the basis of the image data DB3 (the pieces of line image data DB_B1, DB_B3, DB_B5, DB_B7, and so on) to thereby generate the image data DC3 (the pieces of line image data DC_B1, DC_B3, DC_B5, DC_B7, and so on) ((E) and (J) of FIG. 8).

The determination unit 40 sequentially performs a determination process with respect to the four processors 31A to 31D in a period T.

First, at a timing t11, the determination processor 45 selects the processor 31A (the channel CH0), and generates the selection control signal SEL based on a result of the selection ((A) of FIG. 8). The selector 41 selects the image data DB0 related to the channel CH0 on the basis of this selection control signal SEL ((B) of FIG. 7 and (B) of FIG. 8). As a result, the line image data DB_R0 included in the image data DB0 is supplied to the processor 42 (the channel CH4) ((F) of FIG. 7 and (F) of FIG. 8). The processor 42 performs a predetermined process on the basis of the line image data DB_R0 to thereby generate the line image data DC_R0 ((L) of FIG. 8). Further, the line image data DC_R0 is supplied to the comparison section 44. Meanwhile, the selector 43 selects the image data DC0 related to the channel CH0 on the basis of the selection control signal SEL ((G) of FIG. 7 and (G) of FIG. 8). As a result, the line image data DC_R0 included in the image data DC0 is supplied to the comparison section 44 ((K) of FIG. 7 and (K) of FIG. 8).

The comparison section 44 compares the line image data DC_R0 supplied from the processor 42 and the line image data DC_R0 supplied from the selector 43 with each other.

In this example, the selected processor 31A (the channel CH0) and the processor 42 (the channel CH4) are not malfunctioning. Therefore, these pieces of line image data DC_R0 match each other ((K) and (L) of FIG. 8). Accordingly, the comparison section 44 determines that the processor 31A (the channel CH0) and the processor 42 (the channel CH4) are not malfunctioning. As a result, the determination result collection unit 26 maintains the error signal ERR at the low level ((M) of FIG. 7 and (M) of FIG. 8).

Next, at a timing t12, the determination processor 45 selects the processor 31B (the channel CH1), and generates the selection control signal SEL based on a result of the selection ((A) of FIG. 8). The selector 41 selects the image data DB1 related to the channel CH1 on the basis of the selection control signal SEL ((C) of FIG. 7 and (C) of FIG. 8). As a result, the line image data DB_Gr2 included in the image data DB1 is supplied to the processor 42 (the channel CH4) ((F) of FIG. 7 and (F) of FIG. 8). The processor 42 performs a predetermined process on the basis of the line image data DB_Gr2 to thereby generate the line image data DC_Gr2 ((L) of FIG. 8). Further, the line image data DC_Gr2 is supplied to the comparison section 44. Meanwhile, the selector 43 selects the image data DC1 related to the channel CH1 on the basis of the selection control signal SEL ((H) of FIG. 7 and (H) of FIG. 8). As a result, the line image data DC_Gr2 included in the image data DC1 is supplied to the comparison section 44 ((K) of FIG. 7 and (K) of FIG. 8).

The comparison section 44 compares the line image data DC_Gr2 supplied from the processor 42 and the line image data DC_Gr2 supplied from the selector 43 with each other. In this example, the selected processor 31B (the channel CH1) and the processor 42 (the channel CH4) are not malfunctioning. Therefore, these pieces of line image data DC_Gr2 match each other ((K) and (L) of FIG. 8). Accordingly, the comparison section 44 determines that the processor 31B (the channel CH1) and the processor 42 (the channel CH4) are not malfunctioning. As a result, the determination result collection unit 26 maintains the error signal ERR at the low level ((M) of FIG. 7 and (M) of FIG. 8).

Next, at a timing t13, the determination processor 45 selects the processor 31C (the channel CH2), and generates the selection control signal SEL based on a result of the selection ((A) of FIG. 8). The selector 41 selects the image data DB2 related to the channel CH2 on the basis of the selection control signal SEL ((D) of FIG. 7 and (D) of FIG. 8). As a result, the line image data DB_Gb5 included in the image data DB2 is supplied to the processor 42 (the channel CH4) ((F) of FIG. 7 and (F) of FIG. 8). The processor 42 performs a predetermined process on the basis of the line image data DB_Gb5 to thereby generate the line image data DC_Gb5 ((L) of FIG. 8). Further, the line image data DC_Gb5 is supplied to the comparison section 44. Meanwhile, the selector 43 selects the image data DC2 related to the channel CH2 on the basis of the selection control signal SEL ((I) of FIG. 7 and (I) of FIG. 8). As a result, the line image data DC_Gb5 included in the image data DC2 is supplied to the comparison section 44 ((K) of FIG. 7 and (K) of FIG. 8).

The comparison section 44 compares the line image data DC_Gb5 supplied from the processor 42 and the line image data DC_Gb5 supplied from the selector 43 with each other. In this example, the selected processor 31C (the channel CH2) and the processor 42 (the channel CH4) are not malfunctioning. Therefore, these pieces of line image data DC_Gb5 match each other ((K) and (L) of FIG. 8). Accordingly, the comparison section 44 determines that the processor 31C (the channel CH2) and the processor 42 (the channel CH4) are not malfunctioning. As a result, the determination result collection unit 26 maintains the error signal ERR at the low level ((M) of FIG. 7 and (M) of FIG. 8).

Next, at a timing t14, the determination processor 45 selects the processor 31D (the channel CH3), and generates the selection control signal SEL based on a result of the selection ((A) of FIG. 8). The selector 41 selects the image data DB3 related to the channel CH3 on the basis of the selection control signal SEL ((E) of FIG. 7 and (E) of FIG. 8). As a result, the line image data DB_B7 included in the image data DB3 is supplied to the processor 42 (the channel CH4) ((F) of FIG. 7 and (F) of FIG. 8). The processor 42 performs a predetermined process on the basis of the line image data DB_B7 to thereby generate the line image data DC_B7 ((L) of FIG. 8). Further, the line image data DC_B7 is supplied to the comparison section 44. Meanwhile, the selector 43 selects the image data DC3 related to the channel CH3 on the basis of the selection control signal SEL ((J) of FIG. 7 and (J) of FIG. 8). As a result, the line image data DC_B7 included in the image data DC3 is supplied to the comparison section 44 ((K) of FIG. 7 and (K) of FIG. 8).

The comparison section 44 compares the line image data DC_B7 supplied from the processor 42 and the line image data DC_B7 supplied from the selector 43 with each other. In this example, the selected processor 31D (the channel CH3) and the processor 42 (the channel CH4) are not malfunctioning. Therefore, these pieces of line image data DC_B7 match each other ((K) and (L) of FIG. 8). Accordingly, the comparison section 44 determines that the processor 31D (the channel CH3) and the processor 42 (the channel CH4) are not malfunctioning. As a result, the determination result collection unit 26 maintains the error signal ERR at the low level ((M) of FIG. 7 and (M) of FIG. 8).

In this manner, the determination unit 40 sequentially performs the determination process with respect to the four processors 31A to 31D once for each unit of the line image data in the period T. Further, the determination unit 40 repeats this process at a cycle of the period T. Thus, the determination unit 40 cyclically selects the four processors 31A to 31D to thereby repeatedly perform the determination process with respect to the four processors 31A to 31D in the frame period F.

Next, operation of the image processing unit 30 and the determination unit 40 in a case with occurrence of a malfunction is described in detail with reference to several examples.

FIG. 9 illustrates an operation example of the image processing unit 30 and the determination unit 40 in a case where the processor 31B (the channel CH1) of the image processing unit 30 is malfunctioning. In (H) of FIG. 9, a portion W1 represents a portion of image data different from the desired image data. In this example, the processor 31B (the channel CH1) is malfunctioning at and after a timing t21. Therefore, at and after the timing t21, the image data DC1 generated by the processor 31B is different from the desired image data ((H) of FIG. 9).

The determination unit 40 cyclically selects the four processors 31A to 31D to thereby repeatedly perform the determination process with respect to the four processors 31A to 31D. Further, at a timing t22, the determination processor 45 selects the processor 31B (the channel CH1), and generates the selection control signal SEL based on a result of the selection. The selector 41 selects the image data DB1 related to the channel CH1 on the basis of the selection control signal SEL ((C) of FIG. 9). As a result, the line image data included in the image data DB1 is supplied to the processor 42 (the channel CH4) ((F) of FIG. 9). The processor 42 performs a predetermined process on the basis of the line image data to thereby generate line image data ((L) of FIG. 9). Further, the line image data is supplied to the comparison section 44. Meanwhile, the selector 43 selects the image data DC1 related to the channel CH1 on the basis of the selection control signal SEL ((H) of FIG. 9). As a result, the line image data included in the image data DC1 is supplied to the comparison section 44 ((K) of FIG. 9).

The comparison section 44 compares the line image data supplied from the processor 42 ((L) of FIG. 9) and the line image data supplied from the selector 43 ((K) of FIG. 9) with each other. In this example, the processor 31B (the channel CH1) is malfunctioning at and after the timing t21. Therefore, the line image data supplied from the processor 42 and the line image data supplied from the selector 43 do not match each other. The determination processor 45 supplies the determination data INF3 including this comparison result to the determination result collection unit 26. As a result, the determination result collection unit 26 varies the error signal ERR from the low level to the high level ((M) of FIG. 9).

Thereafter, the determination processor 45 continues to perform the determination process with respect to the four processors 31A to 31D. Further, in a period from the timing t22 to a timing t23, the determination processor 45 determines which processor of the processors 31A to 31D and 42 (the channels CH0 to CH4) is malfunctioning on the basis of a result of the determination process performed once with respect to each of the four processors 31A to 31D. In this example, the comparison result indicates "non-matching" only in a case where the processor 31B (the channel CH1) is selected, and the comparison result indicates "matching" in a case where the processor 31C (the channel CH2) is selected, in a case where the processor 31D (the channel CH3) is selected, and in a case where the processor 31A (the channel CH0) is selected. Accordingly, the determination processor 45 determines that the processor 31B is malfunctioning. Further, the determination processor 45 supplies the determination data INF3 including this determination result to the determination result collection unit 26.

In this example, because the processor 31B (the channel CH1) is malfunctioning, the image processing unit 30 outputs image data different from the desired image data. Accordingly, the imaging apparatus 1 transmits image data different from the desired transmission data to the host device 100 (not illustrated). Further, the determination processor 45 notifies the determination result collection unit 26 that the processor 31B (the channel CH1) is malfunctioning, and the determination result collection unit 26 activates the error signal ERR.

FIG. 10 illustrates an operation example of the image processing unit 30 and the determination unit 40 in a case where the processor 42 (the channel CH4) of the determination unit 40 is malfunctioning. In (L) of FIG. 10, a portion W2 represents a portion of image data different from the desired image data. In this example, the processor 42 (the channel CH4) is malfunctioning at and after a timing t26. Therefore, at and after the timing t26, image data DS generated by the processor 42 is different from the desired image data ((L) of FIG. 10).

The determination unit 40 cyclically selects the four processors 31A to 31D to thereby repeatedly perform the determination process with respect to the four processors 31A to 31D. At the timing t26, the determination processor 45 selects the processor 31D (the channel CH3), and generates the selection control signal SEL based on a result of the selection. The selector 41 selects the image data DB3 related to the channel CH3 on the basis of the selection control signal SEL ((E) of FIG. 10). As a result, the line image data included in the image data DB3 is supplied to the processor 42 (the channel CH4) ((F) of FIG. 10). The processor 42 performs a predetermined process on the basis of the line image data to thereby generate line image data ((L) of FIG. 10). Further, the line image data is supplied to the comparison section 44. Meanwhile, the selector 43 selects the image data DC3 related to the channel CH3 on the basis of the selection control signal SEL ((J) of FIG. 10). As a result, the line image data included in the image data DC3 is supplied to the comparison section 44 ((K) of FIG. 10).

The comparison section 44 compares the line image data supplied from the processor 42 ((L) of FIG. 10) and the line image data supplied from the selector 43 ((K) of FIG. 10) with each other. In this example, the processor 42 (the channel CH4) of the determination unit 40 is malfunctioning at and after the timing t26. Therefore, the line image data supplied from the processor 42 and the line image data supplied from the selector 43 do not match each other. The determination processor 45 supplies the determination data INF3 including this comparison result to the determination result collection unit 26. As a result, the determination result collection unit 26 varies the error signal ERR from the low level to the high level ((M) of FIG. 10).

Thereafter, the determination processor 45 continues to perform the determination process with respect to the four processors 31A to 31D. Further, in a period from the timing t26 to a timing t27, the determination processor 45 determines which processor of the processors 31A to 31D and 42 (the channels CH0 to CH4) is malfunctioning on the basis of a result of the determination process performed once with respect to each of the four processors 31A to 31D. In this example, the comparison result indicates "non-matching" in a case where any of the processors 31A to 31D (the channels CH0 to CH3) is selected. Accordingly, the determination processor 45 determines that the processor 42 of the determination unit 40 is malfunctioning. Further, the determination processor 45 supplies the determination data INF3 including this determination result to the determination result collection unit 26.

In this example, because the processor 42 (the channel CH4) is malfunctioning but the processors 31A to 31D (the channels CH0 to CH3) are not malfunctioning, the image processing unit 30 outputs the desired image data. Accordingly, the imaging apparatus 1 transmits the desired transmission data to the host device 100 (not illustrated). Further, the determination processor 45 notifies the determination result collection unit 26 that the processor 42 (the channel CH3) is malfunctioning, and the determination result collection unit 26 activates the error signal ERR.

As described above, in the imaging apparatus 1, the processor 42 having the same circuit configuration as each of the four processors 31 of the image processing unit 30 is provided. The determination processor 45 selects one of the four processors 31A to 31D, and the selector 41 supplies, to the processor 42, the image data DB inputted to the selected processor 31. Further, the comparison section 44 compares the image data DC generated by the selected processor 31 and the image data DS generated by the processor 42 with each other, and the determination processor 45 performs determination with respect to the image processing unit 30 on the basis of the comparison result obtained by the comparison section 44. Thus, in the imaging apparatus 1, it is possible to perform the determination process in a period for performing imaging operation (normal operation) (a so-called runtime).

That is, for example, in a case where a period for determination is provided in a period different from a period in which the imaging apparatus performs the imaging operation (the normal operation), such as a so-called vertical blanking period, and the determination process is performed, for example, with use of data for determination, the time for performing the determination process is limited. Therefore, it may not be possible to perform sufficient determination. Further, it is desired that the data for determination have a data pattern with high accuracy for detecting a malfunction. It is therefore necessary to provide a generation circuit that generates such data for determination.

In contrast, according to the present embodiment, the determination process is allowed to be performed in parallel with the normal image processing in the period for performing the imaging operation. Therefore, it is possible to secure the time for performing the determination process. Further, the determination process is allowed to be performed with use of the actual image data obtained by the imaging operation. This makes it unnecessary to provide a generation circuit that generates the data for determination. As described above, in the imaging apparatus 1, it is possible to secure the time for performing the determination process and also to perform the determination process with use of the actual image data. It is therefore possible to improve determination accuracy in the imaging apparatus 1.

[Effects]

As described above, according to the present embodiment, the processor 42 having the same circuit configuration as each of the four processors 31 is provided. The determination processor selects one of the four processors 31, and the selector 41 supplies, to the processor 42, the image data inputted to the selected processor 31. Further, the comparison section compares the image data generated by the selected processor 31 and the image data generated by the processor 42 with each other, and the determination processor performs determination with respect to the image processing unit on the basis of the comparison result obtained by the comparison section. Thus, in the imaging apparatus, it is possible to perform the determination process in a period for performing imaging operation (normal operation).

[Modification 1-1]

According to the above-described embodiment, the four processors 31 are sequentially selected in a time-division manner on the basis of a unit of line image data; however, this is non-limiting. Alternatively, for example, the four processors 31 may be sequentially selected in a time-division manner on the basis of a unit of a plurality of pieces of line image data, or the four processors 31 may be sequentially selected in a time-division manner on the basis of a unit of image data less than the image data for one line.

[Modification 1-2]

According to the above-described embodiment, four processors 31 are provided in the image processing unit 30; however, this is non-limiting. Alternatively, for example, three or less and two or more processors 31 may be provided, or five or more processors 31 may be provided.

[Modification 1-3]

According to the above-described embodiment, as illustrated in FIG. 9, the determination processor 45 determines which processor of the processors 31A to 31D and 42 (the channels CH0 to CH4) is malfunctioning on the basis of the result of performing the determination process once with respect to each of the four processors 31A to 31D in the period from the timing t22 to the timing t23; however, this is non-limiting. For example, in a case where, at or after the timing t22, the comparison result in a case where the determination process is performed with respect to the processor 31B indicates "non-matching" and thereafter, the comparison result in a case where the determination process is performed with respect to the processor 31C indicates "matching", the processor 31B may be determined as being malfunctioning.

Similarly, according to the above-described embodiment, as illustrated in FIG. 10, the determination processor 45 determines which processor of the processors 31A to 31D and 42 (the channels CH0 to CH4) is malfunctioning on the basis of the result of performing the determination process once with respect to each of the four processors 31A to 31D in the period from the timing t26 to the timing t27; however, this is non-limiting. For example, in a case where, at or after the timing t26, the comparison result in a case where the determination process is performed with respect to the processor 31D indicates "non-matching" and thereafter, the comparison result in a case where the determination process is performed with respect to the processor 31A indicates "non-matching", the processor 42 may be determined as being malfunctioning.

[Other Modifications]

in addition, two or more of these modifications may be combined.

2. Second Embodiment

Next, an imaging apparatus 2 according to a second embodiment is described. The present embodiment is configured to perform, in a case where any one of the four processors 31 in an image processing apparatus is malfunctioning, image processing with use of the processor 42 of a determination unit instead of the processor 31 which is malfunctioning. Note that component parts substantially the same as those of the imaging apparatus 1 according to the first embodiment described above are denoted by the same reference numerals, and descriptions thereof are omitted as appropriate.

As illustrated in FIG. 1, the imaging apparatus 2 includes an image processing unit 50 and a determination unit 60. The image processing unit 50 is configured to perform predetermined image processing on the basis of the image data DTB supplied from the sensor interface 21 to thereby generate image data DTD. The determination unit 60 is configured to perform a determination process with respect to the image processing unit 50 to thereby detect a malfunction in the image processing unit 50.

FIG. 11 illustrates a configuration example of the image processing unit 50 and the determination unit 60. The image data DTD generated by the image processing unit 50 includes four pieces of image data DD (pieces of image data DD0 to DD3).

The image processing unit 50 includes a replacing section 51. The replacing section 51 is configured to replace one of the four pieces of image data DC0 to DC3 generated by the four processors 31A to 31D with the image data DS generated by the processor 42 on the basis of a control signal CTL, to thereby generate four pieces of image data DD0 to DD3. The replacing section 51 includes four selectors 52 (selectors 52A, 52B, 52C, and 52D). The selector 52A is configured to select one of the image data DC0 and the image data DS on the basis of a control signal CTLA included in the control signal CTL, and output the selected image data as the image data DD0. The selector 52B is configured to select one of the image data DC1 and the image data DS on the basis of a control signal CTLB included in the control signal CTL, and output the selected image data as the image data DD1. The selector 52C is configured to select one of the image data DC2 and the image data DS on the basis of a control signal CTLC included in the control signal CTL, and output the selected image data as the image data DD2. The selector 52D is configured to select one of the image data DC3 and the image data DS on the basis of a control signal CTLD included in the control signal CTL, and output the selected image data as the image data DD3. With this configuration, any one of the four selectors 52 selects the image data DS on the basis of the control signal CTL and the replacing section 51 thereby generates the four pieces of image data DD0 to DD3.

The determination unit 60 includes a determination processor 65. The determination processor 65 is configured to control a determination process with respect to the image processing unit 50. Specifically, as with the determination processor 45 according to the first embodiment described above, the determination processor 65 generates a selection control signal SEL giving an instruction to select any one of the processors 31A to 31D (the channels CH0 to CH3) in the image processing unit 50. Further, the determination processor 65 determines which processor of the processors 31A to 31D and 42 (the channels CH0 to CH4) is malfunctioning on the basis of a comparison result obtained by the comparison section 44 in a case where the processor 31A (the channel CH0) is selected, a comparison result obtained by the comparison section 44 in a case where the processor 31B (the channel CH1) is selected, a comparison result obtained by the comparison section 44 in a case where the processor 31C (the channel CH2) is selected, and a comparison result obtained by the comparison section 44 in a case where the processor 31D (the channel CH3) is selected. Further, the determination processor 65 notifies the determination result collection unit 26 of determination data INF3 indicating a result of the determination regarding the image processing unit 50. Further, in a case where any of the processors 31A to 31D (the channels CH0 to CH3) is malfunctioning, the determination processor 65 generates the control signal CTL giving an instruction to replace the image data DC generated by the processor 31 which is malfunctioning with the image data DS generated by the processor 42.

Here, the replacing section 51 corresponds to a specific example of a "replacing section" in the present disclosure. The pieces of image data DD0 to DD3 correspond to a specific example of "two or more fourth signals" in the present disclosure.

FIG. 12 illustrates an operation example of the image processing unit 50 and the determination unit 60 in a case where the processor 31B (the channel CH1) of the image processing unit 50 is malfunctioning. In (H) of FIG. 12, a portion W3 represents a portion of image data different from the desired image data. In this example, the processor 31B (the channel CH1) is malfunctioning at and after a timing t33. Therefore, at and after the timing t33, the image data DC1 generated by the processor 31B is different from the desired image data ((H) of FIG. 12).

The frame period F starts at a timing t31, and at a timing t32, the image processing unit 50 starts generating the pieces of image data DD0 to DD3 on the basis of the pieces of image data DB0 to DB3 ((B) to (E), (G) to (J), and (N) to (Q) of FIG. 12).

FIG. 13 illustrates an operation state of the image processing unit 50 and the determination unit 60. A bold line indicates a path for image data. At the timing t32, the processors 31A, 31B, 31C, and 31D (the channels CH0 to CH3) are not malfunctioning. Accordingly, the processor 31A (the channel CH0) performs image processing on the basis of the image data DB0 to thereby generate the image data DC0. The selector 52A selects the image data DC0 on the basis of the control signal CTLA, and outputs the image data DC0 as the image data DD0. Similarly, the processor 31B (the channel CH1) performs image processing on the basis of the image data DB1 to thereby generate the image data DC1. The selector 52B selects the image data DC1 on the basis of the control signal CTLB, and outputs the image data DC1 as the image data DD1. The processor 31C (the channel CH2) performs image processing on the basis of the image data DB2 to thereby generate the image data DC2. The selector 52C selects the image data DC2 on the basis of the control signal CTLC, and outputs the image data DC2 as the image data DD2. The processor 31D (the channel CH3) performs image processing on the basis of the image data DB3 to thereby generate the image data DC3. The selector 52D selects the image data DC3 on the basis of the control signal CTLD, and outputs the image data DC3 as the image data DD3.

As with the case of the first embodiment described above, the determination unit 60 cyclically selects the four processors 31A to 31D to thereby repeatedly perform the determination process with respect to the four processors 31A to 31D ((B) to (M) of FIG. 12). In this example, the processor 31B (the channel CH1) malfunctions at a timing t33. Accordingly, at and after the timing t33, the image data DC1 generated by the processor 31B is different from the desired image data.

Further, at a timing t34, the determination processor 65 selects the processor 31B (the channel CH1), and generates the selection control signal SEL based on a result of the selection. The selector 41 selects the image data DB1 related to the channel CH1 on the basis of the selection control signal SEL ((C) of FIG. 12). As a result, the line image data included in the image data DB1 is supplied to the processor 42 (the channel CH4) ((F) of FIG. 12). The processor 42 performs a predetermined process on the basis of the line image data to thereby generate line image data ((L) of FIG. 12). Further, the line image data is supplied to the comparison section 44. Meanwhile, the selector 43 selects the image data DC1 related to the channel CH1 on the basis of the selection control signal SEL ((H) of FIG. 12). As a result, the line image data included in the image data DC1 is supplied to the comparison section 44 ((K) of FIG. 12).

The comparison section 44 compares the line image data supplied from the processor 42 ((L) of FIG. 12) and the line image data supplied from the selector 43 ((K) of FIG. 12) with each other. In this example, the processor 31B (the channel CH1) is malfunctioning at and after the timing t33. Therefore, the line image data supplied from the processor 42 and the line image data supplied from the selector 43 do not match each other. The determination processor 65 supplies determination data INF3 including this comparison result to the determination result collection unit 26. As a result, the determination result collection unit 26 varies the error signal ERR from the low level to the high level ((M) of FIG. 12).

Further, in a period from a timing t34 to a timing t35, the determination processor 65 determines which processor of the processors 31A to 31D and 42 (the channels CH0 to CH4) is malfunctioning on the basis of a result of the determination process performed once with respect to each of the four processors 3A to 31D. In this example, the comparison result indicates "non-matching" only in a case where the processor 31B (the channel CH1) is selected, and the comparison result indicates "matching" in a case where the processor 31C (the channel CH2) is selected, and in cases where the processor 31D (the channel CH3) and the processor 31A (the channel CH0) are selected. Accordingly, the determination processor 65 determines that the processor 31B is malfunctioning. Further, the determination processor 65 supplies the determination data INF3 including this determination result to the determination result collection unit 26.

Further, at and after the timing t35, the determination processor 65 selects the processor 31B (the channel CH1) which is malfunctioning, and generates the selection control signal SEL based on a result of the selection. Further, the determination processor 65 generates the control signal CTL giving an instruction to replace the image data DC generated by the processor 31B (the channel CH1) which is malfunctioning with the image data DS generated by the processor 42.

FIG. 14 illustrates an operation state of the image processing unit 50 and the determination unit 60. A bold line indicates a path for image data. At and after the timing t35, the selector 41 selects the image data DB1 inputted to the processor 31B (the channel CH1) on the basis of the selection control signal SEL, and supply the image data DB1 to the processor 42 (the channel CH4). The processor 42 performs image processing on the basis of the image data DB1 to thereby generate the image data DS (the image data DC1). The selector 52B of the replacing section 51 selects the image data DS on the basis of the control signal CTL, and outputs the image data DS as the image data DD1. In such a manner, the replacing section 51 replaces the image data DC1 of the four pieces of image data DC0 to DC3 generated by the four processors 31A to 31D with the image data DS (the image data DC1) generated by the processor 42 on the basis of the control signal CTL, to thereby generate the four pieces of image data DD0 to DD3.

In this example, the image processing unit 50 outputs the desired image data at and after the timing t35 even in a case where the processor 31B (the channel CH1) malfunctions. Accordingly, the imaging apparatus 1 transmits the desired transmission data to the host device 100 (not illustrated). Further, the determination processor 65 notifies the determination result collection unit 26 that the processor 31B (the channel CH1) is malfunctioning, and the determination result collection unit 26 activates the error signal ERR.

FIG. 15 illustrates an operation example of the image processing unit 50 and the determination unit 60 in a case where the processor 42 (the channel CH4) of the determination unit 60 is malfunctioning. In (L) of FIG. 15, a portion W4 indicates a portion of image data different from the desired image data. In this example, the processor 42 (the channel CH4) is malfunctioning at and after a timing t36. Accordingly, at and after the timing t36, the image data DS generated by the processor 42 is different from the desired image data ((L) of FIG. 15).

The determination unit 60 cyclically selects the four processors 31A to 31D to thereby repeatedly perform the determination process with respect to the four processors 31A to 31D. At the timing t36, the determination processor 65 selects the processor 31D (the channel CH3), and generates the selection control signal SEL based on a result of the selection. The selector 41 selects the image data DB3 related to the channel CH3 on the basis of the selection control signal SEL ((E) of FIG. 15). As a result, the line image data included in the image data DB3 is supplied to the processor 42 (the channel CH4) ((F) of FIG. 15). The processor 42 performs a predetermined process on the basis of the line image data to thereby generate line image data ((L) of FIG. 15). Further, the line image data is supplied to the comparison section 44. Meanwhile, the selector 43 selects the image data DC3 related to the channel CH3 on the basis of the selection control signal SEL ((J) of FIG. 15). As a result, the line image data included in the image data DC3 is supplied to the comparison section 44 ((K) of FIG. 15).

The comparison section 44 compares the line image data supplied from the processor 42 ((L) of FIG. 15) and the line image data supplied from the selector 43 ((K) of FIG. 15) with each other. In this example, the processor 42 (the channel CH4) of the determination unit 60 is malfunctioning at and after the timing t36. Therefore, the line image data supplied from the processor 42 and the line image data supplied from the selector 43 do not match each other. The determination processor 65 supplies determination data INF3 including this comparison result to the determination result collection unit 26. As a result, the determination result collection unit 26 varies the error signal ERR from the low level to the high level ((M) of FIG. 15).

Thereafter, the determination processor 65 continues to perform the determination process with respect to the four processors 31A to 31D. Further, in a period from the timing t36 to a timing t37, the determination processor 65 determines which processor of the processors 31A to 31D and 42 (the channels CH0 to CH4) is malfunctioning on the basis of a result of the determination process performed once with respect to each of the four processors 31A to 31D. In this example, the comparison result indicates "non-matching" in any case where one of the processors 31A to 31D (the channels CH1 to CH4) is selected. Accordingly, the determination processor 65 determines that the processor 42 of the determination unit 60 is malfunctioning. Further, the determination processor 65 supplies the determination data INF3 including this determination result to the determination result collection unit 26.

In this example, because the processor 42 (the channel CH4) is malfunctioning but the processors 31A to 31D (the channels CH0 to CH3) are not malfunctioning, the image processing unit 50 outputs the desired image data. That is, as illustrated in FIG. 13, the processor 31A (the channel CH0) performs image processing on the basis of the image data DB0 to thereby generate the image data DC0. The selector 52A selects the image data DC0 on the basis of the control signal CTLA, and outputs the image data DC0 as the image data DD0. This is similarly applicable to the processors 31B to 31D (the channels CH0 to CH3) and the selectors 52B to 52D. Accordingly, the imaging apparatus 2 transmits the desired transmission data to the host device 100 (not illustrated). Further, the determination processor 65 notifies the determination result collection unit 26 that the processor 42 (the channel CH3) is malfunctioning, and the determination result collection unit 26 activates the error signal ERR.

As described above, the imaging apparatus 2 is provided with the replacing section 51. The replacing section 51 replaces one of the four pieces of image data DC0 to DC3 generated by the four processors 31A to 31D with the image data DS generated by the processor 42 on the basis of the comparison result obtained by the comparison section 44. Accordingly, in the imaging apparatus 2, in a case where any of the processors 31A to 31D (the channels CH0 to CH3) malfunctions, the processor 42 generates the image data DS on the basis of the image data DB supplied to the processor 31 which is malfunctioning, and the replacing section 51 replaces the image data DC outputted from the processor 31 which is malfunctioning with the image data DS. It is thereby possible to output the desired image data. Thus, in the imaging apparatus 2, it is possible to output the desired image data even in a case where the processor 31 malfunctions. It is therefore possible to achieve a so-called fail-operational configuration.

As described above, according to the present embodiment, one of the four pieces of image data generated by the four processors 31 is replaced with the image data generated by the processor 42 on the basis of the comparison result obtained by the comparison section. Therefore, it is possible to output the desired image data even in a case of malfunctioning.

[Modification 2-1]

According to the embodiment described above, the determination process is performed on the basis of the actual image data obtained by the imaging operation; however, the determination process may be performed further on the basis of test data TS. An imaging apparatus 2A according to the present modification is described below in detail. As with the imaging apparatus 2 (FIG. 1) according to the second embodiment described above, the imaging apparatus 2A includes an image processing unit 50A and a determination unit 60A.

FIG. 16 illustrates a configuration example of the image processing unit 50A and the determination unit 60A. Image data DTD generated by the image processing unit 50 includes four pieces of image data DD (pieces of image data DD0 to DD3).

The image processing unit 50A includes a replacing section 51A. As with the replacing section 51 according to the second embodiment described above, the replacing section 51A is configured to replace one of the four pieces of image data DC0 to DC3 generated by the four processors 31A to 31D with the image data DS generated by the processor 42 on the basis of a control signal CTL, to thereby generate four pieces of image data DD0 to DD3. Further, the replacing section 51A outputs the respective pieces of test data TS generated by a test data generator 62A (which will be described later) as each of the four pieces of image data DD0 to DD3, for example, in a vertical blanking period.

The determination unit 60 includes the test data generator 62A, a selector 63A, comparison sections 67A and 68A, an OR circuit 69A, and a determination processor 65A.

The test data generator 62A is configured to generate test data TS having a predetermined signal pattern, for example, in a vertical blanking period on the basis of an instruction given from the determination processor 65A.

The selector 63A is configured to select one of the image data DS supplied from the processor 42 (the channel CH4) and the test data TS supplied from the test data generator 62A on the basis of a selection control signal SEL2, and supply the selected data to the comparison section 44 and the replacing section 51A. Specifically, in this example, the selector 63A is configured to select the image data DS supplied from the processor 42 (the channel CH4) in a period in which the image data DTB is supplied from the sensor interface 21, and select the test data TS supplied from the test data generator 62A in the vertical blanking period.

The comparison section 67A is configured to perform comparison operation of comparing the image data DD0 and the image data DD2 with each other, for example, in the vertical blanking period on the basis of a control signal CTL2.

The comparison section 68A is configured to perform comparison operation of comparing the image data DD1 and the image data DD3 with each other, for example, in the vertical blanking period on the basis of the control signal CTL2.

The OR circuit 69A is configured to determine the OR (OR) of the comparison results obtained by the comparison sections 44, 67A, and 68A. Here, the comparison result obtained by the comparison section 44 is "1" in the case of "non-matching" and is "0" in the case of "matching". This is similarly applicable to the comparison results obtained by the comparison sections 67A and 68A. That is, the OR circuit 69A outputs "0" in a case where all of the comparison results obtained by the comparison sections 44, 67A, and 68A indicate "matching", and outputs "1" in a case where any one or more of the comparison results obtained by the comparison sections 44, 67A, and 68A indicate "non-matching".

The determination processor 65A is configured to control a determination process with respect to the image processing unit 50A. The determination processor 65A controls the determination process with respect to the replacing section 51A, for example, in the vertical blanking period. Specifically, the determination processor 65A so controls operation of the test data generator 62A that the test data generator 62A generates the test data TS in the vertical blanking period. Further, the determination processor 65A generates, in the vertical blanking period, the selection control signal SEL2 giving an instruction to select the test data TS generated by the test data generator 62A. Further, the determination processor 65A generates, in the vertical blanking period, a control signal CTL giving an instruction that the replacing section 51A is to output the test data TS as each of the four pieces of image data DD0 to DD3. The determination processor 65A generates, in the vertical blanking period, the control signal CTL2 giving an instruction that the comparison sections 67A and 68A are to perform the comparison operation. Further, the determination processor 65A is configured to detect whether or not the replacing section 51A is malfunctioning on the basis of an output signal from the OR circuit 69A in the vertical blanking period.

Here, the test data generator 62A corresponds to a specific example of a "signal generator" in the present disclosure. The comparison sections 67A and 67B correspond to a specific example of a "second comparison section" in the present disclosure.

FIG. 17 illustrates an operation example of the image processing unit 50A and the determination unit 60A.

At a timing t41, the frame period F starts, and in a period from a timing t42 to a timing t43, the image processing unit 50A generates the pieces of image data DD0 to DD3 on the basis of the pieces of image data DB0 to DB3 ((B) to (E), (G) to (J), and (N) to (Q) of FIG. 17).

Further, in a period from the timing t43 to a timing t44 (the vertical blanking period), the test data generator 62A generates the test data TS, and the selector 63A supplies the test data TS to the replacing section 51. The replacing section 51A outputs the test data TS as each of the four pieces of image data DD0 to DD3 ((N) to (Q) of FIG. 17).

In the period from the timing t43 to the timing t44, the comparison section 67A compares the image data DD0 and the image data DD2 with each other, and the comparison section 68A compares the image data DD1 and the image data DD3 with each other. In a case where the replacing section 51A is not malfunctioning, the image data DD0 and the image data DD2 are expected to be the same as each other, and the image data DD1 and the image data DD3 are expected to be the same as each other. In this case, the OR circuit 69A outputs "0". As a result, the determination result collection unit 26 maintains the error signal ERR at a low level ((M) of FIG. 17).

In a case where the replacing section 51A is malfunctioning, for example, the image data DD0 and the image data DD2 do not match each other, or the image data DD1 and the image data DD3 do not match each other. In this case, the OR circuit 69A outputs "I". Therefore, the determination processor 65A determines that the replacing section 51A is malfunctioning. Further, the determination processor 65A supplies the determination data INF3 including this comparison result to the determination result collection unit 26.

In the imaging apparatus 2A, the test data generator 62A and the comparison sections 67A and 68A are provided, and for example, in the vertical blanking period, the replacing section 51A outputs the test data TS generated by the test data generator 62A and having the predetermined signal pattern as each of the pieces of image data DD0 to DD3. Further, the comparison section 67A compares the image data DD0 and the image data DD2 with each other, and the comparison section 68A compares the image data DD1 and the image data DD3 with each other. Accordingly, it is possible to detect a malfunction of the replacing section 51A in the imaging apparatus 2A.

Note that, in this example, the comparison section 67A compares the image data DD0 and the image data DD2 with each other, and the comparison section 68A compares the image data DD1 and the image data DD3 with each other; however, this is non-limiting. Alternatively, for example, the comparison section 67A may compare the image data DD0 and the image data DD1 with each other, and the comparison section 68A may compare the image data DD2 and the image data DD3 with each other.

Further, in this example, two comparison sections 67A and 67B are provided; however, this is non-limiting. Alternatively, for example, a single comparison section may be provided, and this comparison section may compare whether the four pieces of image data DD0 to DD3 match each other.

Further, in this example, the test data generator 62A generates a single piece of test data TS; however, this is non-limiting. Alternatively, for example, the test data generator may generate two pieces of test data TS (test data TS1 and test data TS2) different from each other, and the replacing section 51A may output the test data TS1 as each of the pieces of image data DD0 and DD2, and output the test data TS2 as each of the pieces of image data DD1 and DD3.

[Modification 2-2]

Each of the modifications according to the first embodiment described above may be applied to the imaging apparatus 2 according to the embodiment described above.

[Other Modifications]

In addition, two or more of these modifications may be combined.

3. Examples of Use of Imaging Apparatus

FIG. 18 illustrates examples of use of the imaging apparatuses 1 and 2 according to the embodiments described above. The imaging apparatus 1 described above is usable, for example, in various cases of sensing light including visible light, infrared light, ultraviolet light, X-rays, and the like as follows.

An apparatus that shoots an image to be used for viewing, examples of which include a digital camera and a mobile device with a camera function.

An apparatus provided for a traffic use, examples of which include: an on-vehicle sensor that captures an image of a front region, a rear region, a surrounding region, an inside region, or the like of an automobile for safe driving including automatic stopping and the like or for recognition of a driver state; a monitoring camera that monitors a traveling vehicle, a road, or the like; and a ranging sensor that performs ranging of a vehicle-to-vehicle distance or the like.

An apparatus provided in a home appliance such as a television, a refrigerator, or an air conditioner, for capturing an image of a gesture of a user and performing a device operation based on the gesture.

An apparatus provided for medical and health-care uses, examples of which include: an endoscope, an apparatus that captures an image of a blood vessel by infrared-light reception An apparatus provided for a security use, examples of which include a security-use monitoring camera and a person-authentication-use camera.

An apparatus provided for a beauty use, examples of which include a skin measuring apparatus capturing an image of skin and a microscope capturing an image of a scalp.

An apparatus provided for a sports use, examples of which include an action camera for sports use or the like and a wearable camera.

An apparatus provided for an agriculture use, examples of which include a camera for monitoring a condition of a field, a crop, and the like.

4. Examples of Application to Mobile Bodies

The technology (the present technology) according to the present disclosure is applicable to various products. For example, the technology according to the present disclosure may be implemented as an apparatus to be mounted on any kind of mobile body such as an automobile, an electric vehicle, a hybrid electric vehicle, a motorcycle, a bicycle, a personal mobility, an aircraft, a drone, a vessel, or a robot.

FIG. 19 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (IF) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 19, an audio speaker 12061, a display section 12062, and an instrument panel 12063 are illustrated as the output device. The display section 12062 may, for example, include at least one of an on-board display and a head-up display.

FIG. 20 is a diagram depicting an example of the installation position of the imaging section 12031.

In FIG. 20, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally. FIG. 20 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 in the configuration described above. This allows the vehicle control system 12000 to detect a malfunction of the imaging section 12031 with high accuracy. Consequently, in the vehicle control system 12000, it is possible to detect a malfunction even in a case where the malfunction occurs in a vehicle collision avoidance function, a vehicle collision mitigation function, a following traveling function based on a vehicle-to-vehicle distance, a vehicle speed maintaining traveling function, a vehicle collision alert function, a vehicle lane departure alert function, or the like. This makes it possible to increase robustness of the system.

The present technology has been described above with reference to the embodiments, modifications, and specific application examples thereof; however, the present technology is not limited to the embodiments and the like and may be variously modified.

For example, in each of the above-described embodiments, four pixels PR, PGr, PGb. and PB are used to provide the pixel array 11; however, this is non-limiting. Alternatively, for example, three pixels (a red pixel PR, a green pixel PG, and a blue pixel PB) may be used to provide a pixel array.

Note that the effects described herein are merely illustrative and non-limiting, and other effects may be provided.

Note that the present technology may have the following configurations. According to the present technology having the following configurations, it is possible to perform determination during the normal operation.

(1) A signal processing device including:
two or more first processors provided in association with two or more first signals, the two or more first processors each being configured to perform a predetermined process on the basis of an associated first signal of the two or more first signals to thereby generate a second signal;
a controller configured to select any one of the two or more first processors and generate a selection control signal based on a result of the selection;
a first selection section configured to select the first signal to be supplied to the selected first processor, of the two or more first signals, on the basis of the selection control signal;
a second processor configured to perform the predetermined process on the basis of the first signal selected by the first selection section, of the two or more first signals, to thereby generate a third signal;
a second selection section configured to select the second signal generated by the selected first processor, of the two or more second signals, on the basis of the selection control signal; and
a first comparison section configured to compare the third signal and the second signal selected by the second selection section of the two or more second signals with each other.

(2) The signal processing device according to (1) described above, in which the controller is configured to perform determination regarding the two or more first processors and the second processor on the basis of a comparison result obtained by the first comparison section.

(3) The signal processing device according to (2) described above, in which the controller is configured to, in a case where the comparison result obtained by the first comparison section indicates non-matching when a particular processor of the two or more first processors is selected, and the comparison result obtained by the first comparison section indicates matching when one or more processors of the two or more first processors other than the particular processor are sequentially selected, determine that the particular processor is malfunctioning.

(4) The signal processing device according to (1) or (2) described above, in which the controller is configured to determine that the second processor is malfunctioning in a case where the comparison result obtained by the first comparison section indicates non-matching when two or more processors of the two or more first processors are sequentially selected.
(5) The signal processing device according to (2) described above, further including
a replacing section configured to replace one of the two or more second signals with the third signal on the basis of a control signal to thereby generate two or more fourth signals, in which
the controller is configured to generate the control signal on the basis of a result of the determination.
(6) The signal processing device according to (5) described above, in which the replacing section includes two or more third selection sections that are provided in association with the two or more first processors and are each configured to select, on the basis of the control signal, one of the third signal and the second signal outputted from an associated first processor of the two or more first processors.
(7) The signal processing device according to (5) or (6) described above, in which
the controller is configured to
select a particular processor of the two or more first processors in a case where the comparison result obtained by the first comparison section indicates non-matching when the particular processor of the two or more first processors is selected, and the comparison result obtained by the first comparison section indicates matching when one or more processors of the two or more first processors other than the particular processor are sequentially selected,
generate the selection control signal based on a result of the selection, and
generate the control signal giving an instruction that the replacing section is to replace the second signal generated by the particular processor with the third signal.
(8) The signal processing device according to any one of (5) to (7) described above, in which the controller is configured to generate the control signal giving an instruction that the replacing section is to output the two or more second signals as the two or more fourth signals in a case where the comparison result obtained by the first comparison section indicates non-matching when two or more processors of the two or more first processors are sequentially selected.
(9) The signal processing device according to any one of (5) to (8) described above, further including
a signal generator configured to generate a fifth signal; and
a second comparison section configured to perform comparison operation on the basis of the two or more fourth signals, in which
the two or more first processors are each configured to perform the predetermined process in a first period,
the replacing section is configured to output the fifth signal as two or more signals of the two or more fourth signals in a second period outside the first period, and
the second comparison section is configured to compare the two or more signals with each other.
(10) The signal processing device according to any one of (1) to (9) described above, further including an output unit configured to output a signal based on a comparison result obtained by the first comparison section.
(11) The signal processing device according to any one of (1) to (10) described above, in which the predetermined process includes at least one of a gain adjustment process, a white balance adjustment process, a black level adjustment process, an HDR synthesis process, a noise removal process, or a pixel defect correction process.
(12) A signal processing method including:
causing each of two or more first processors provided in association with two or more first signals to perform a predetermined process on the basis of an associated first signal of the two or more first signals to thereby generate a second signal;
selecting any one of the two or more first processors and generating a selection control signal based on a result of the selecting;
selecting the first signal to be supplied to the selected first processor, of the two or more first signals, on the basis of the selection control signal;
causing a second processor to perform the predetermined process on the basis of the selected first signal of the two or more first signals to thereby generate a third signal;
selecting the second signal generated by the selected first processor, of the two or more second signals, on the basis of the selection control signal; and
comparing the third signal and the selected second signal of the two or more second signals with each other.
(13) An imaging apparatus including:
an imager configured to perform imaging operation to thereby generate an image signal including two or more first signals;
two or more first processors provided in association with the two or more first signals, the two or more first processors each being configured to perform a predetermined process on the basis of an associated first signal of the two or more first signals to thereby generate a second signal;
a controller configured to select any one of the two or more first processors and generate a selection control signal based on a result of the selection;
a first selection section configured to select the first signal to be supplied to the selected first processor, of the two or more first signals, on the basis of the selection control signal;
a second processor configured to perform the predetermined process on the basis of the first signal selected by the first selection section, of the two or more first signals, to thereby generate a third signal;
a second selection section configured to select the second signal generated by the selected first processor, of the two or more second signals, on the basis of the selection control signal; and
a first comparison section configured to compare the third signal and the second signal selected by the second selection section of the two or more second signals with each other.

This application claims the priority on the basis of Japanese Patent Application No. 2019-146248 filed on Aug. 8, 2019 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A signal processing device comprising:
    two or more first processors provided in association with two or more first signals, the two or more first processors each being configured to perform a predetermined process on a basis of an associated first signal of the two or more first signals to thereby generate a second signal;
    a controller configured to select any one of the two or more first processors and generate a selection control signal based on a result of the selection;
    a first selection section configured to select the first signal to be supplied to the selected first processor, of the two or more first signals, on a basis of the selection control signal;
    a second processor configured to perform the predetermined process on a basis of the first signal selected by the first selection section, of the two or more first signals, to thereby generate a third signal;
    a second selection section configured to select the second signal generated by the selected first processor, of the two or more second signals, on the basis of the selection control signal; and
    a first comparison section configured to compare the third signal and the second signal selected by the second selection section of the two or more second signals with each other.

2. The signal processing device according to claim 1, wherein the controller is configured to perform determination regarding the two or more first processors and the second processor on a basis of a comparison result obtained by the first comparison section.

3. The signal processing device according to claim 2, wherein the controller is configured to, in a case where the comparison result obtained by the first comparison section indicates non-matching when a particular processor of the two or more first processors is selected, and the comparison result obtained by the first comparison section indicates matching when one or more processors of the two or more first processors other than the particular processor are sequentially selected, determine that the particular processor is malfunctioning.

4. The signal processing device according to claim 2, wherein the controller is configured to determine that the second processor is malfunctioning in a case where the comparison result obtained by the first comparison section indicates non-matching when two or more processors of the two or more first processors are sequentially selected.

5. The signal processing device according to claim 2, further comprising
    a replacing section configured to replace one of the two or more second signals with the third signal on a basis of a control signal to thereby generate two or more fourth signals, wherein
    the controller is configured to generate the control signal on a basis of a result of the determination.

6. The signal processing device according to claim 5, wherein the replacing section includes two or more third selection sections that are provided in association with the two or more first processors and are each configured to select, on the basis of the control signal, one of the third signal and the second signal outputted from an associated first processor of the two or more first processors.

7. The signal processing device according to claim 5, wherein
    the controller is configured to
    select a particular processor of the two or more first processors in a case where the comparison result obtained by the first comparison section indicates non-matching when the particular processor of the two or more first processors is selected, and the comparison result obtained by the first comparison section indicates matching when one or more processors of the two or more first processors other than the particular processor are sequentially selected,
    generate the selection control signal based on a result of the selection, and
    generate the control signal giving an instruction that the replacing section is to replace the second signal generated by the particular processor with the third signal.

8. The signal processing device according to claim 5, wherein the controller is configured to generate the control signal giving an instruction that the replacing section is to output the two or more second signals as the two or more fourth signals in a case where the comparison result obtained by the first comparison section indicates non-matching when two or more processors of the two or more first processors are sequentially selected.

9. The signal processing device according to claim 5, further comprising
    a signal generator configured to generate a fifth signal; and
    a second comparison section configured to perform comparison operation on a basis of the two or more fourth signals, wherein
    the two or more first processors are each configured to perform the predetermined process in a first period,
    the replacing section is configured to output the fifth signal as two or more signals of the two or more fourth signals in a second period outside the first period, and
    the second comparison section is configured to compare the two or more signals with each other.

10. The signal processing device according to claim 1, further comprising an output unit configured to output a signal based on a comparison result obtained by the first comparison section.

11. The signal processing device according to claim 1, wherein the predetermined process includes at least one of a gain adjustment process, a white balance adjustment process, a black level adjustment process, an HDR synthesis process, a noise removal process, or a pixel defect correction process.

12. A signal processing method comprising:
    causing each of two or more first processors provided in association with two or more first signals to perform a predetermined process on a basis of an associated first signal of the two or more first signals to thereby generate a second signal;
    selecting any one of the two or more first processors and generating a selection control signal based on a result of the selecting;
    selecting the first signal to be supplied to the selected first processor, of the two or more first signals, on a basis of the selection control signal;
    causing a second processor to perform the predetermined process on a basis of the selected first signal of the two or more first signals to thereby generate a third signal;
    selecting the second signal generated by the selected first processor, of the two or more second signals, on the basis of the selection control signal; and comparing the third signal and the selected second signal of the two or more second signals with each other.

13. An imaging apparatus comprising:

an imager configured to perform imaging operation to thereby generate an image signal including two or more first signals;

two or more first processors provided in association with the two or more first signals, the two or more first processors each being configured to perform a predetermined process on a basis of an associated first signal of the two or more first signals to thereby generate a second signal;

a controller configured to select any one of the two or more first processors and generate a selection control signal based on a result of the selection;

a first selection section configured to select the first signal to be supplied to the selected first processor, of the two or more first signals, on a basis of the selection control signal;

a second processor configured to perform the predetermined process on a basis of the first signal selected by the first selection section, of the two or more first signals, to thereby generate a third signal;

a second selection section configured to select the second signal generated by the selected first processor, of the two or more second signals, on the basis of the selection control signal; and a first comparison section configured to compare the third signal and the second signal selected by the second selection section of the two or more second signals with each other.

* * * * *